US011043729B2

(12) United States Patent
Roy et al.

(10) Patent No.: US 11,043,729 B2
(45) Date of Patent: Jun. 22, 2021

(54) FLEXIBLE ANTENNA FOR A WIRELESS RADIATION DOSIMETER

(71) Applicant: BEST MEDICAL CANADA LTD., Ottawa (CA)

(72) Inventors: Langis Roy, Whitby (CA); Ololade Sanusi, Whitby (CA); Farhan Abdul Ghaffar, Oshawa (CA); Atif Shamim, Milton (CA)

(73) Assignee: BEST MEDICAL CANADA LTD., Ottawa (CA)

( * ) Notice: Subject to any disclaimer, the term of this patent is extended or adjusted under 35 U.S.C. 154(b) by 134 days.

(21) Appl. No.: 16/268,070

(22) Filed: Feb. 5, 2019

(65) Prior Publication Data

US 2020/0251806 A1    Aug. 6, 2020

(51) Int. Cl.

| | |
|---|---|
| *H01Q 1/22* | (2006.01) |
| *H01Q 1/08* | (2006.01) |
| *H01Q 7/00* | (2006.01) |
| *A61J 1/10* | (2006.01) |
| *G06K 7/10* | (2006.01) |
| *G01T 1/02* | (2006.01) |
| *H01Q 9/06* | (2006.01) |

(52) U.S. Cl.
CPC .............. *H01Q 1/2225* (2013.01); *A61J 1/10* (2013.01); *G01T 1/026* (2013.01); *G06K 7/10079* (2013.01); *H01Q 1/085* (2013.01); *H01Q 7/00* (2013.01); *H01Q 9/065* (2013.01)

(58) Field of Classification Search
CPC ........ H01Q 1/2225; H01Q 1/085; H01Q 7/00; H01Q 9/065; H01Q 9/16; H01Q 15/0026; G06K 7/10079; G01T 1/026; A61J 1/10; A61J 2205/60
See application file for complete search history.

(56) References Cited

U.S. PATENT DOCUMENTS

| | | | | |
|---|---|---|---|---|
| 7,652,268 | B2 * | 1/2010 | Patel | ............... G01T 1/06 250/484.5 |
| 7,831,016 | B2 * | 11/2010 | Saoudi | ............ A61N 5/1048 378/65 |
| 10,152,667 | B2 * | 12/2018 | Gabriel | ............... B29C 70/78 |

(Continued)

FOREIGN PATENT DOCUMENTS

FR        2945128 A       11/2010

OTHER PUBLICATIONS

Hickman Susan, "NSERC grant boosts research on tiny sensor with great potential in biomedicine", Available at Carleton Now—http://carletonnow.carleton.ca, Dec. 11, 2013,1 page.

P. Padilla De La Torre et al., "Characterization of artificial magnetic conductor strips for parallel plate planar antennas", vol. 50, Issue 2, Microwave and Optical Technology Letters, Dec. 2007, 7 pages.

Toth Stephen, "An Efficient RF Rectifier for Energy Harvesting Systems with Applications to Wireless Dosimetry", Carleton University, MSc Thesis, 2014, 203 pages.

(Continued)

*Primary Examiner* — Seokjin Kim

(57) ABSTRACT

A flexible antenna for a wireless X-ray dosimeter chip is described. The flexible antenna includes a dipole antenna associated with an artificial magnetic conductor, wherein the artificial magnetic conductor includes: a top layer configured to partially act as a reflective surface; a bottom conductive ground plane layer configured to prevent propagation of incident electromagnetic waves and to reflect the electromagnetic waves; and a middle layer including a foam material configured to provide an appropriate phase delay between incident electromagnetic waves from the top layer and the reflected waves from the ground plane layer.

12 Claims, 18 Drawing Sheets

(56) References Cited

U.S. PATENT DOCUMENTS

| | | | | |
|---|---|---|---|---|
| 2001/0033233 | A1* | 10/2001 | Jentsch | A61J 1/05 |
| | | | | 340/870.17 |
| 2003/0231142 | A1* | 12/2003 | McKinzie, III | H01Q 15/008 |
| | | | | 343/909 |
| 2010/0096556 | A1* | 4/2010 | Arsalan | G01T 1/026 |
| | | | | 250/370.07 |
| 2011/0168920 | A1* | 7/2011 | Yoder | G01T 3/00 |
| | | | | 250/484.5 |
| 2013/0033700 | A1* | 2/2013 | Hallil | A61N 5/1071 |
| | | | | 356/72 |
| 2015/0116093 | A1* | 4/2015 | Swager | G06K 19/0717 |
| | | | | 340/10.4 |
| 2015/0192475 | A1* | 7/2015 | Eisenstadt | G01K 1/02 |
| | | | | 340/870.17 |
| 2017/0098894 | A1* | 4/2017 | Kawata | H01Q 15/002 |
| 2019/0036206 | A1* | 1/2019 | de Rochemont | H01Q 7/00 |

OTHER PUBLICATIONS

Yadegari, Behzad, "Low Power Gamma-Ray FG-MOSFET Dosimeter in 0.13 um CMOS Technology", Carleton University, MSc Thesis, 2012, 143 pages.

CMC Microsystems, "University expertise develops X-ray sensor for Canadian Biomedical company", Success Stories, Annual Report, 2013/2014, 3 pages.

Yadegari, Behzad et al., "An Efficient and Compact Wireless Solution for Blood Sterilization Apparatus", ANTEM, Jul. 2018, 3 pages.

CMC Microsystems, "University expertise develops X-ray sensor for Canadian Biomedical company", Impact, Feb. 2014, 1 pages.

PCT International Search Report, PCT/CA2020/050094, dated Apr. 2020, 5 pages.

PCT Written Opinion of the International Searching Authority, PCT/CA2020/050094, dated Apr. 2020, 8 pages.

* cited by examiner

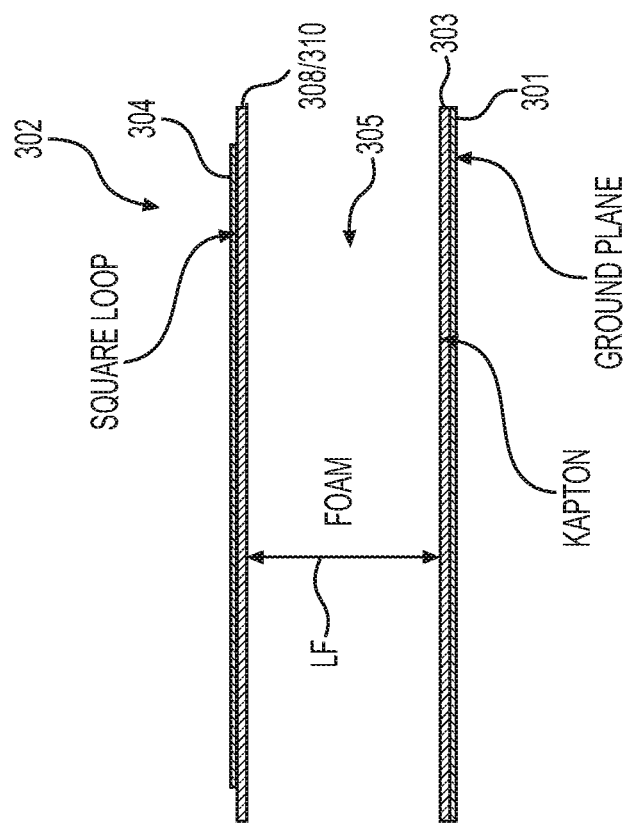
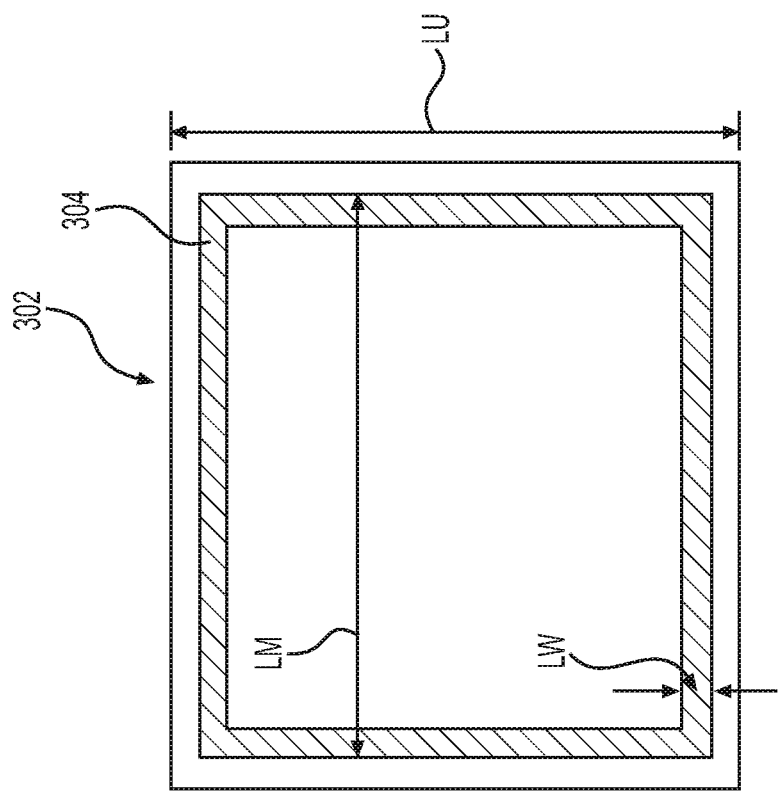
FIG. 4A
FIG. 4B

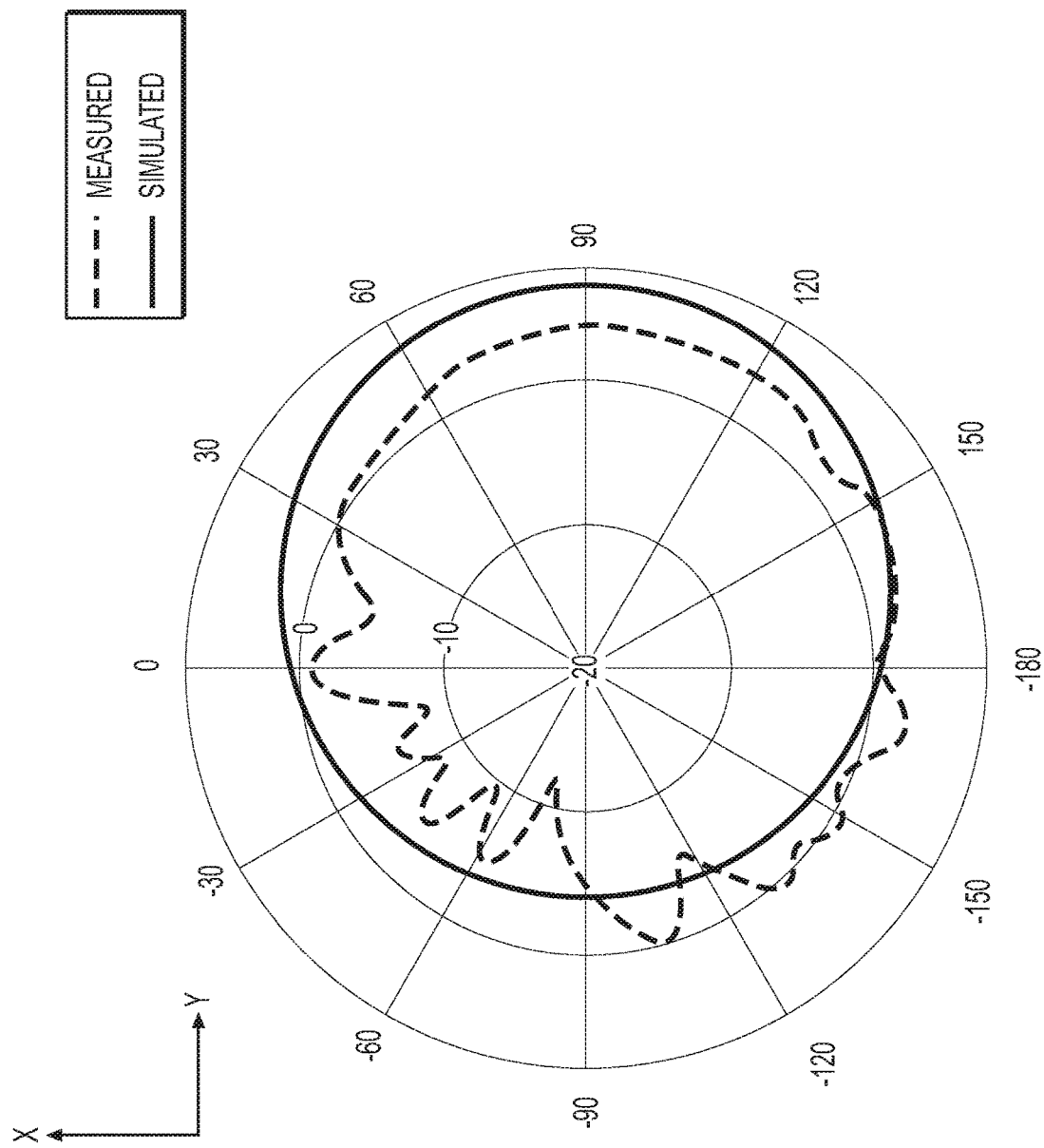

FLEXIBLE ANTENNA FOR A WIRELESS RADIATION DOSIMETER

FIELD OF THE INVENTION

The present invention relates generally to medical sensors, and more particularly, to a dipole antenna structure for use in a wireless dosimeter tag for biomedical applications.

DESCRIPTION OF RELATED ART

Recent research initiatives for biomedical applications have addressed the design of flexible and wearable medical devices for early disease detection and prevention health monitoring and reduction of invasive medical procedures. This has created an increasing demand for flexible, conformal, compact, low-power wireless power transfer (WPT) modules that are easy to fabricate, low-cost and maintain efficient performance on diverse host structures.

The key component in the design of these wireless modules is the antenna structure. The literature reports the use of flexible materials such as conductive fabrics and polydimethylsiloxane (PDMS) substrate, liquid metal and paper to achieve conformity. The aforementioned demands have also inspired the use of additive technologies like inkjet printing to achieve flexible and robust antenna designs for use with everyday clothing, wearable sensors, biomedical wireless sensors and radio frequency identification (RFID) systems.

Biomedical applications not only require conformal antenna structures but more importantly, antenna designs that maintain efficient performance on a human body, as in, or in the presence of body tissues for in-vivo applications. Amongst a few others, these designs have revealed that the human body and body tissues negatively impact antenna performance due to their high permittivity, thereby acting as lossy structures. For these scenarios, where the antenna calls for some isolation from its environment or host, there is ongoing research on metamaterials acting as high impedance surfaces (HIS) as a means of realizing thinner and light weight antennas and even improved antenna gain, as demonstrated in the prior art. HIS structures are periodic structures acting as frequency selective surfaces (FSS) to control the propagation of electromagnetic waves. They can act as artificial magnetic conductors (AMC) by reflecting incident waves without phase reversal at a specific frequency; the incident waves see a high impedance surface (open circuit) at the design frequency, mimicking a perfect magnetic conductor (PMC), and permitting efficient radiation for antennas placed parallel and close to the surface.

A number of sensors having a variety of functionalities for the targeted application have been reported in the prior art. These include passive and active circuit designs. For example, US Patent Application, US2010/0096556A1 to Langis Roy et al. discloses a miniaturized floating gate metal-oxide semiconductor field-effect transistor (FGMOSFET) radiation sensor. The sensor preferably comprises a matched pair of sensor and reference FGMOSFETs wherein the sensor FGMOSFET has a larger area floating gate with an extension over a field oxide layer, for accumulation of charge and increased sensitivity.

Several patents have been issued on color changing indicators, monitors, detectors, and dosimeters for monitoring a variety of biomedical processes. For example, US patent application, US 2011/0168920 A1 to Yoder et al. discloses a device comprising a dosimeter for measuring one or more doses of radiation; and an RFID tag comprising an antenna for communicating with an RFID tag reader and non-volatile memory for storing data therein. This disclosure utilizes an optically stimulated luminescence (OSL) sensor that includes a reference filter material and is used to adjust the dose determined by the reference sensor at very low energies of x-rays or gamma rays.

For example, U.S. Pat. No. 7,652,268 to Patel et al. discloses a general purpose dosimeter reader for determination of a radiation dosage, based on comparison of an image of a treated dosimeter with a series of images of a pre-treated dosimeter. The dosimeter undergoes a color change proportional to the dosage. The sensor may have more than one indicator of the same or different classes. The color change may be a gradual color development or intensification; a gradual color fading: a gradual color change or an abrupt color change.

For example, U.S. Patent Application US2015/0116093A1 to Swager discloses method of detecting a stimulus that can include detecting an output from a radio frequency identification tag including a sensor. The sensor portion is configured to change resistivity when the stimulus contacts or interacts with the radio frequency identification tag, whereby the resistivity change alters the output of the radio frequency identification tag, wherein the radio frequency identification tag includes a carbon nanotube or multiple carbon nanotubes.

For example, the French Patent Application, FR2945128A1 discloses a dosimeter for use during a radiotherapy treatment session, which has a printed circuit board wrapped in an envelope forming material, and a metal-oxide semiconductor field-effect transistor (MOSFET) placed on printed circuit board. A RFID (radiofrequency identification device) to identify the dosimeter using an electronic device such as a memory chip containing data and capable of using an antenna to transmit information to a reader is also disclosed. The RFID device may be integrated to the printed circuit board or retrofitted thereon.

Presently blood products are irradiated in chambers using X-ray or gamma-ray sources to prevent transfusion associated graft versus host disease (TA-GvHD). Typically, blood product irradiation is identified using radiation-sensitive color indicators known as RadTags. Once applied to the blood bags, these labels give positive, visual verification of irradiation provided when a minimum of 25 gray (Gy) has been received. For example, after irradiation, a human operator visually checks the color on each tag to verify that the blood is sufficiently irradiated. However, this non-quantitative approach makes it difficult for a human operator to ascertain whether or not the blood in the blood bag under irradiation has received over 50 Gy, a maximum recommended dosage, thereby resulting in operational and cost inefficiencies. It is evident from the current state of art that work is yet to be done on the design of wireless X-ray dosimeters that control and automate the irradiation process and alleviate the limitations found in the currently used technology, such as wastage of blood, handling errors, and uncertainties of the exact X-ray dose received.

Moreover, the challenge surrounding antenna design has to do with the environment and medium in which it has to operate. The presence of the blood bags around radio frequency (RF) waves will result in significant attenuation of the signals due to the highly lossy nature of the blood content. This requires a solution which can shield the electromagnetic waves from the blood.

Therefore, there is a need for improvements in antenna structures for use with the sensors to realize improved gain and impedance performance upon placement on lossy structures. Thus, a flexible and efficient antenna structure for wireless power transfer and readout in the field of X-ray dosimetry RFID wireless dosimeter chip and tag devices, such as for use in measuring an amount of radiation delivered to blood by a blood irradiation system, addressing the aforementioned problems is desired.

SUMMARY OF INVENTION

Embodiments of artificial magnetic conductor (AMC) backed flexible antennas for a radiation dosimeter, such as an X-ray dosimeter, and of methods for detecting radiation dose are described.

Embodiments of a flexible artificial magnetic conductor (AMC)-backed antenna for a wireless radiation dosimeter, such as an X-ray dosimeter, are described. An embodiment of an AMC-backed flexible antenna, for example, comprises a dipole antenna, and at least one AMC unit cell communicatively associated with the dipole antenna, wherein each AMC unit cell comprises a top layer including a metallization pattern, the top layer configured as a partially reflective surface to reflect electromagnetic waves of a frequency other than a predetermined frequency of interest, a bottom conductive ground plane layer configured to reduce, prevent or substantially prevent propagation of electromagnetic waves at the predetermined frequency of interest and to reflect the electromagnetic waves at the predetermined frequency of interest, and a middle layer comprising a foam material configured to provide a predetermined phase delay between the electromagnetic waves of the predetermined frequency of interest from the top layer and the reflected electromagnetic waves of the predetermined frequency of interest from the ground plane layer to reduce, prevent or substantially prevent phase reversal of electromagnetic waves at the predetermined frequency of interest.

In embodiments, methods for detecting the radiation dose of X-rays delivered to a blood bag are described. An embodiment of a method for detecting and measuring a radiation dose delivered to a blood bag, for example, includes the steps of: applying to a specific blood bag a wireless dosimeter chip-enabled tag having a predetermined identification (ID) value corresponding to a specific blood bag, the wireless dosimeter chip-enabled tag being communicatively associated with an AMC-backed flexible antenna, the AMC-backed flexible antenna including a dipole antenna, and at least one artificial magnetic conductor (AMC) unit cell communicatively associated with the dipole antenna, wherein each AMC unit cell includes a top layer including a metallization pattern, the top layer configured as a partially reflective surface to reflect electromagnetic waves of a frequency other than a predetermined frequency of interest, a bottom conductive ground plane layer configured to substantially prevent propagation of electromagnetic waves at the predetermined frequency of interest and to reflect the electromagnetic waves at the predetermined frequency of interest, and a middle layer comprising a foam material configured to provide a predetermined phase delay between the electromagnetic waves of the predetermined frequency of interest from the top layer and the reflected electromagnetic waves of the predetermined frequency of interest from the ground plane layer to substantially prevent phase reversal of electromagnetic waves at the predetermined frequency of interest; irradiating blood in the specific blood bag with 25 gray (Gy) to 50 Gy of radiation from an X-ray source; transmitting from a reader a modulated radio frequency signal including the predetermined frequency containing the predetermined ID value to the wireless dosimeter chip-enabled tag having the predetermined ID value; receiving the modulated radio frequency signal containing the predetermined ID value by the AMC-backed flexible antenna communicatively associated with the wireless dosimeter chip-enabled tag having the predetermined ID value; transmitting from the wireless dosimeter chip-enabled tag having the predetermined ID value to the reader the modulated radio frequency signal reflected by the AMC-backed flexible antenna including information corresponding to a radiation dose delivered to the specific blood bag; receiving, by the reader, the reflected modulated radio frequency signal from the wireless dosimeter chip-enabled tag including the information corresponding to the radiation dose delivered to the blood in the specific blood bag; and determining, using the reader, from the received information, an amount of the radiation dose delivered to the blood in the specific blood bag associated with the wireless dosimeter chip-enabled tag having the predetermined ID value.

However, the antenna of the flexible antenna, in embodiments, in addition to being a dipole antenna, can also be other of suitable antennas, such as a monopole antenna, or a phased array antenna, as can depend on the use or application, and should not be construed in a limiting sense.

These, and other features of the invention, will become more apparent from the following specification and drawings, in which reference is made to the appended drawings, illustrating embodiments of the invention, by way of example only.

DESCRIPTION OF THE DRAWINGS

FIG. 4A shows a top view of an embodiment of a 2.45 GHz AMC square loop unit cell, according to the present invention.

FIG. 4B shows a side view of an embodiment of the 2.45 GHz square loop unit cell illustrated in FIG. 4A, according to the present invention.

FIG. 9B shows a representation of a simulated radiation pattern and a measured radiation pattern of the embodiment of the AMC-backed dipole antenna of FIG. 9A in the H-plane (YZ) at 2.45 GHz, according to the present invention.

Unless otherwise indicated, similar reference characters denote corresponding features consistently throughout the attached drawings.

DETAILED DESCRIPTION

Figure 1:
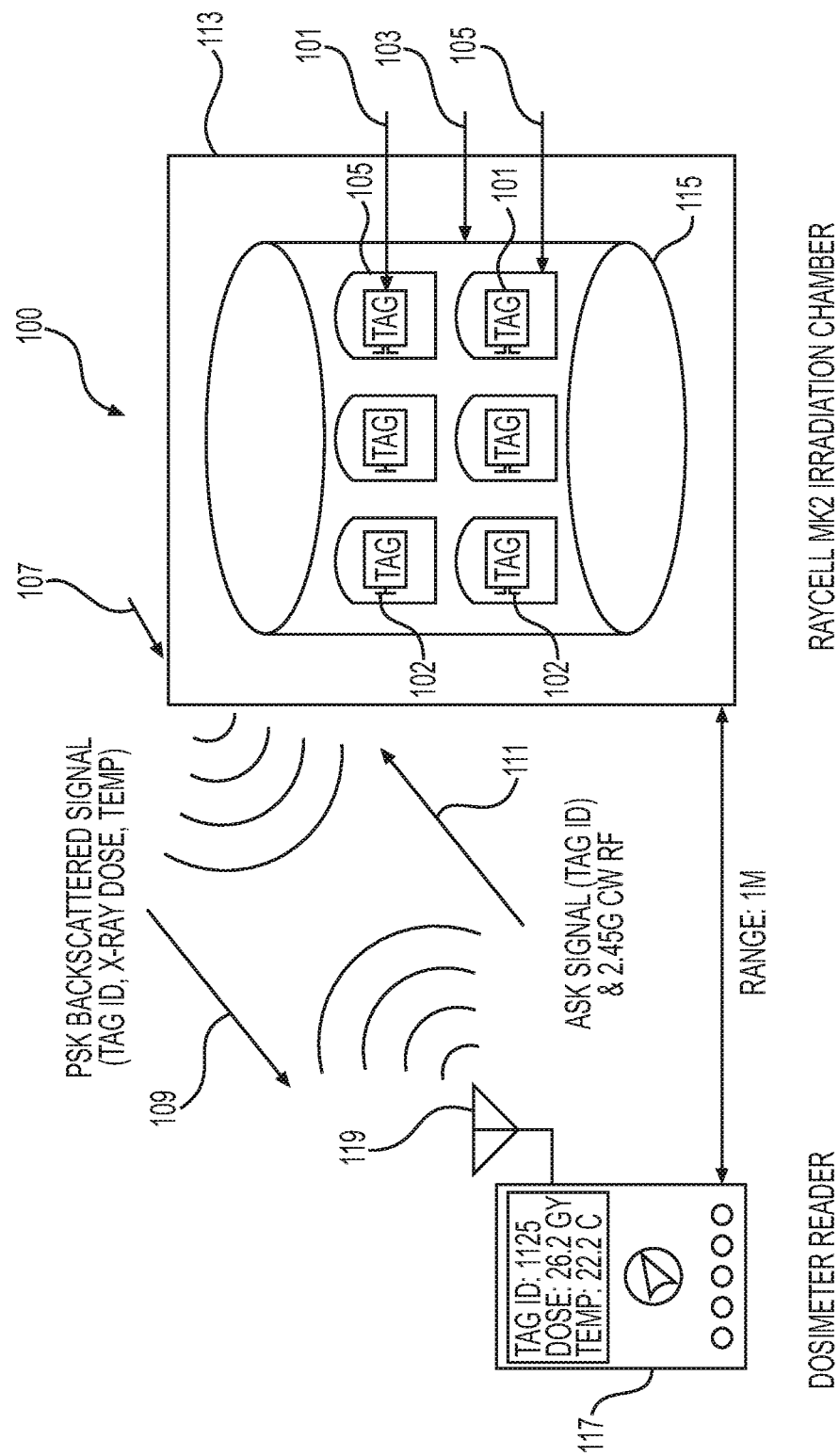
FIG. 1 is a system-level diagram illustrating embodiments of a system and a method for determining an amount of delivered radiation dose to blood bags each associated with a wireless X-ray dosimeter chip-enabled tag having the predetermined ID, according to the present invention.

Embodiments of the disclosure relate to designs of a flexible dipole antenna including one or more artificial magnetic conductor (AMC) unit cells for use with a RFID wireless dosimeter chip-enabled tag, such as can be applied to blood bags, that are to be irradiated by a radiation source, such as an X-ray source, and to methods for determining the radiation dose measured by an RFID wireless dosimeter chip-enabled tag communicatively associated with an AMC-backed antenna using a dosimeter reader that communicates with the RFID wireless dosimeter chip-enabled tag via the flexible AMC-backed antenna, such as a flexible AMC-backed dipole antenna. However, the antenna of the flexible antenna, in addition to being a dipole antenna, can also be other of suitable antennas, such as a monopole antenna, or a phased array antenna, as can depend on the use or application, and should not be construed in a limiting sense.

The term "irradiation", as is used herein, can include, but is not limited to the conventional meaning of the term "irradiation", i.e., exposure to high energy charge particles, e.g., electrons, protons, alpha particles, etc., or electromagnetic radiation of wave-lengths shorter than those of visible light, e.g., gamma rays, X-rays, UltraViolet, etc.

Also, as used herein, the term "antenna" for example, can refer to a conductive interface communicatively associated with a receiver or a transmitter, or both, through which electromagnetic waves, fields or signals, such as radio frequency, microwave or satellite signals or waves, are received or transmitted. Waves or signals that are radio frequency fields can be transmitted through the antenna or be associated with a transducer that converts radio frequency (RF) fields into high frequency current or vice versa. There are typically two basic antenna types: a receiving antenna, such as an antenna which intercepts RF energy and delivers a current/voltage to the electronic equipment, and a transmitting antenna, which is fed with a current/voltage excitation from electronic equipment and generates an RF field or wave for transmission. Thus the same antenna design can be used as a transmitting and a receiving antenna.

Further, as used herein, for example, the term "dosimeter" refers to a device used to measure an absorbed dose of ionizing radiation.

Also, as used herein, the term "ionizing radiation" refers to any of various particulate or electromagnetic radiation that is capable of dissociating atoms into a positively and negatively charged ion pair.

Further, as used herein, the term "foam material" refers to a polymeric foam material in solidified form, formed from polymers. Polymeric foam materials can include, for example, Polyurethane (PUR or PU) foam, or other suitable foam materials as can depend on the use or application, and should not be construed in a limiting sense.

Also, as used herein, an Artificial Magnetic Conductor (AMC) is an artificial, metallic electromagnetic structure as can be, for example, a type of electromagnetic band gap material or a type of synthetic composite having a magnetic conductor surface realized using electrical conductor patterns on a surface suitable for a predetermined range of frequencies, such as a type of implemented metamaterial as can be used in several antennas and microwave design applications, for example. The AMC, by utilizing the characteristics of metamaterials in a unit cell, which do not exist naturally, can enhance the performance of various antenna devices, such as to modify the antenna's radiation pattern and control wave propagation at certain frequencies, as can provide a frequency selective surface, such as at radio frequency and microwave wavelengths, as can be desirable in various antenna applications.

Further, as used herein, inkjet printing as can be used in forming the antenna or the metallization of the AMC, or both, is a type of computer printing that re-creates a digital image by propelling droplets of ink, as can be a metallized or conductive ink material, onto paper, plastic, or other substrates.

In an embodiment, the flexible antenna desirably includes a dipole antenna, or can include other suitable antennas, such as a monopole antenna, or a phased array antenna, and at least one AMC unit cell, wherein the at least one AMC unit cell includes a top layer including a metallization pattern configured to partially act as a reflective surface to reflect electromagnetic waves of a frequency other than a predetermined frequency of interest; a bottom conductive ground plane layer configured to reduce, prevent or substantially prevent propagation of electromagnetic waves at the predetermined frequency of interest and to reflect the electromagnetic waves at the predetermined frequency of interest, and a middle layer comprising a foam material configured to provide a predetermined phase delay between electromagnetic waves at the predetermined frequency of interest from the top layer and the reflected waves at the predetermined frequency of interest from the ground plane layer to reduce, prevent or substantially prevent phase reversal at a predetermined frequency of interest.

In an embodiment, in the flexible antenna, the middle layer comprising the foam material is configured of a suitable material and dimensions so as to pass the electromagnetic waves at the frequency of interest without phase reversal at a predetermined frequency of interest.

In an embodiment, in the flexible antenna, a distance between the top layer and the bottom conductive ground plane layer can be in the range of about 5 mm to about 15 mm.

In another embodiment, in the flexible antenna, the AMC further comprises a plurality of unit cells, with the metallization pattern on the top layer of each unit cell comprising a conductive ink thereby providing the antenna, desirably a dipole antenna, wherein the conductive ink is printed on the top layer by an inkjet printer. The conductive ink can comprise silver nanoparticles or other suitable conductive material, as can depend on the use or application, and should not be construed in a limiting sense. The plurality of unit cells can provide gain to signals received or transmitted by the flexible antenna while facilitating maintaining good radiation characteristics.

In another embodiment, in the flexible antenna, the unit cells desirably include a plurality of square loop cells arranged in n rows×m columns arrays on the top layer of the AMC. The square loop cells are spaced at least 1 mm apart for each other.

In another embodiment, in the flexible antenna, the top layer and the bottom conductive ground plane layer of the AMC include or are formed of a poly (4,4'-oxydiphenylene-pyromellitimide) material, such as Kapton® or other suitable flexible film, as can depend on the use or application, for example, as well as include a conductive material, such as a conductive metallization, such as can be formed by a conductive ink material.

In another embodiment, in the flexible antenna, including the AMC and the dipole antenna structure, operates at a bandwidth in the range of 2.32 GHz to 2.56 GHz. Desirably, such as for blood irradiation applications, the AMC-backed dipole antenna structure operates at a bandwidth of 2.45 GHz (Giga-hertz). The flexible antenna can further be communicatively associated with a rectifier, as an energy harvesting device, configured to convert radiofrequency energy into electrical energy, such as a direct current (dc) corresponding to the received signal, and with an energy storage device, such as a capacitor, as can be included in a dosimeter chip structure or tag, for example.

In an exemplary embodiment, a dosimeter chip structure communicatively associated with embodiments of a flexible antenna can be positioned in association with a blood bag, as can include a bag member to hold blood to be irradiated to measure an amount of radiation dose delivered to blood in the blood bag. The dosimeter chip structure includes a flexible antenna including a dipole antenna communicatively associated with an AMC-backed structure, wherein the AMC-backed structure includes a top layer including a metallization pattern, the top layer configured as a partially reflective surface to reflect electromagnetic waves of a frequency other than a predetermined frequency of interest, a bottom conductive ground plane layer including a conductive material as a ground configured to reduce, prevent or substantially prevent propagation of electromagnetic waves at the predetermined frequency of interest and to reflect the electromagnetic waves at the predetermined frequency of interest, and a middle layer comprising a foam material configured to provide a predetermined phase delay between the electromagnetic waves of the predetermined frequency of interest from the top layer and the reflected electromagnetic waves of the predetermined frequency of interest from the ground plane layer to reduce, prevent or substantially prevent phase reversal of electromagnetic waves at the predetermined frequency of interest, wherein the flexible antenna is configured to transmit information about a radiation dose delivered to blood in the specific blood bag to a receiver, such as when interrogated by a reader or a probe by a signal received by the antenna, such as the dipole antenna, to transmit the information about the radiation dose delivered to the blood in the specific blood bag.

In other embodiments, methods of detecting a radiation dose include: applying to a specific blood bag a wireless dosimeter chip-enabled tag having a unique or predetermined ID value corresponding to the specific blood bag, the wireless dosimeter chip-enabled tag being communicatively associated with an AMC-backed flexible antenna, the AMC-backed flexible antenna comprising a dipole antenna, or other suitable antenna, and an AMC-backed structure, wherein the AMC-backed structure includes a top layer configured to include a metallization pattern to partially act as a reflective surface, a bottom conductive ground plane layer including a conductive material as a ground configured to reduce or prevent propagation of incident electromagnetic waves and to reflect the electromagnetic waves, and a middle layer including a foam material configured to provide an appropriate or predetermined phase delay between incident electromagnetic waves from the top layer and the reflected waves from the ground plane layer; irradiating blood in the specific blood bag with 25 Gy to 50 Gy of radiation from an irradiation source, such as an X-ray source; transmitting from a reader a modulated radio frequency signal containing the unique or predetermined ID value to the flexible antenna communicatively associated with the wireless dosimeter chip-enabled tag attached to the specific blood bag; transmitting from the wireless dosimeter chip-enabled tag having the predetermined ID value to the reader the modulated radio frequency signal reflected by the AMC-backed flexible antenna including information corresponding to a radiation dose delivered to the blood in the specific blood bag; and determining, using the reader, from the received information, an amount of the radiation dose delivered to the blood in the specific blood bag associated with the wireless dosimeter chip-enabled tag having the unique or predetermined ID value. The method of detecting a radiation dose can further include the reader demodulating the received radio frequency signal containing the unique or predetermined ID value associated with the wireless dosimeter chip-enabled tag and associated with the specific blood bag and associating the unique or predetermined ID value and the received information with its own or another ID value. The emitted modulated signal desirably carries information about a sensed radiation dose, such as an X-ray dose, and a sensed temperature of the blood in the specific blood bag but can carry other or different information, as can depend on the use or application, and should not be construed in a limiting sense. The radio signal desirably can operate at a frequency of about 2.45 GHz, but can operate at other suitable frequencies, as can depend on the use or application, and should not be construed in a limiting sense.

The following examples are provided by way of illustration to further illustrate the exemplary embodiments of antennas for use with an X-ray wireless dosimeter chip-enabled tag for blood bags and a method of detecting radiation with a dosimeter reader. However, the embodiments of the AMC-backed antenna and associated wireless dosimeter chip-enabled tags can have other uses or applications, such as for measuring temperature or other parameters or quantities in other processes or applications, and therefore such examples are not intended to limit its scope or application.

FIG. 1 is a system-level diagram illustrating embodiments of a system and a method for determining an amount of delivered radiation dose to blood bags each associated with a wireless X-ray dosimeter chip-enabled tag having the predetermined ID. In an exemplary embodiment of FIG. 1, there is shown a system-level diagram 100 for determining an amount of a delivered radiation dose to blood in blood bags including a wireless dosimeter chip-enabled tag 101, such as for measuring a radiation dose from X-rays, in communication with a specific blood bag 105, a plurality of blood bags 105 and associated wireless dosimeter chip-enabled tags 101 being illustrated in FIG. 1, housed inside an irradiation apparatus 113, such as a Raycell MK2 Blood Irradiator.

The RFID wireless dosimeter chip-enabled tags 101 are applied to corresponding specific blood bags 105 and the blood bags 105 associated with the RFID wireless dosimeter chip-enabled tags 101 are then placed in an irradiation canister 115 of the irradiation apparatus 113. Each wireless dosimeter chip-enabled tag 101 has an identification (ID) value corresponding to a specific blood bag 105. The irradiation apparatus 113 includes an inner canister 103 that houses the blood bags 105 including the blood to be irradiated. The irradiation canister 115 and the irradiation apparatus 113 can also include an RF opening or portal 107 through which the RFID wireless dosimeter chip-enabled tags 101 through an associated AMC-backed antenna 102 can communicate with a dosimeter reader 117. An amplitude-shift keying (ASK) signal (Tag ID 2.45 GHz RF signal) 111 is transmitted from the dosimeter reader 117 though an antenna 119. The signal transmitted from the dosimeter reader 117, such as a modulated radio frequency signal, contains the predetermined ID value corresponding to the wireless dosimeter chip-enabled tag 101 associated with the predetermined ID value. After receipt of the signal 111 from the dosimeter reader 117 received by the corresponding AMC-backed antenna 102, a back scattered signal 109 from the corresponding wireless dosimeter chip-enabled tag 101 associated with the predetermined ID value containing the information from the respective wireless dosimeter chip-enabled tag 101 is transmitted by the respective AMC-backed antenna 102 and received by the antenna 119 of the dosimeter reader 117. The received back scattered signal 109 containing the information or data corresponding to a specific blood bag 105 is read by the dosimeter reader 117.

The dosimeter reader 117 is placed at a suitable distance from the irradiation apparatus 113, as can depend on the use or application, such as typically at a maximum distance of up to 1 meter (m), from the irradiation apparatus 113, to receive the radiation dosage measured by the wireless dosimeter chip-enabled tags 101 associated with the specific blood bags 105 having the respective predetermined ID values. The dosimeter reader 117 can store or can read out, such as wirelessly through the antenna 119 or through a wired connection, the information or data in the respective received backscatter signals 109 from the corresponding wireless dosimeter chip-enabled tags 101, such as the measured radiation dose respectively applied to blood in the specific blood bags 105, or other applicable data for the blood in the specific blood bag 105, such as the temperature of the blood irradiated, time of irradiation or other applicable information or data, for example.

The exemplary 2.45 GHz X-ray wireless dosimeter chip-enabled tag 101 and the associated AMC-backed antenna 102 is intended to replace or is a substitute for the aforementioned color indicator RadTag labels. The 2.45 GHz wireless dosimeter chip-enabled tag 101 is typically used as a semi-passive RFID tag employing backscatter modulation and wireless power transfer to facilitate minimal power consumption and a low-form factor. The wireless dosimeter chip-enabled tag 101 associated with embodiments of the AMC-backed antenna 102 desirably includes an energy harvesting unit, such as a rectifier and a capacitor—for self-powered operation.

Also, embodiments of the wireless dosimeter chip-enabled tag 101 include a suitable sensor, such as a FGMOS-FET sensor, which senses the received radiation dosage to the blood bag 105, signal processing electronics, such as a suitable processor and associated memory, that convert measured data to pulses and a transmitter or modulator that sends the pulses through the AMC-backed antenna 102 to the dosimeter reader 117 operating in the same frequency band. Similar to the RadTag labels, the wireless dosimeter chip-enabled tags 101 and the associated AMC-backed antenna 102 are to be applied to the blood bags 105 as schematically depicted in FIG. 1. Embodiments of the AMC-backed antenna, such as the AMC-backed antenna 102, desirably are compact, conform relatively easily to the wireless dosimeter chip-enabled tag, such as the wireless dosimeter chip-enabled tag 101, have efficient antenna performance on a lossy host structure (such as blood products), and have adequate wireless power transfer operation when implemented in a rectenna configuration. The wireless dosimeter chip-enabled tags 101 desirably are configured to communicate with the RF reader, such as the dosimeter reader 117, typically at a maximum distance of one meter for blood irradiation measurements, for example. Also, it is desirable that power consumption of the wireless dosimeter chip-enabled tag 101 is estimated to consume a power of 263 microwatts (μW) with a nominal supply of 1.2 volts (V), for example, although the power consumed can depend on the use or application, and should not be construed in a limiting sense.

Figure 2:
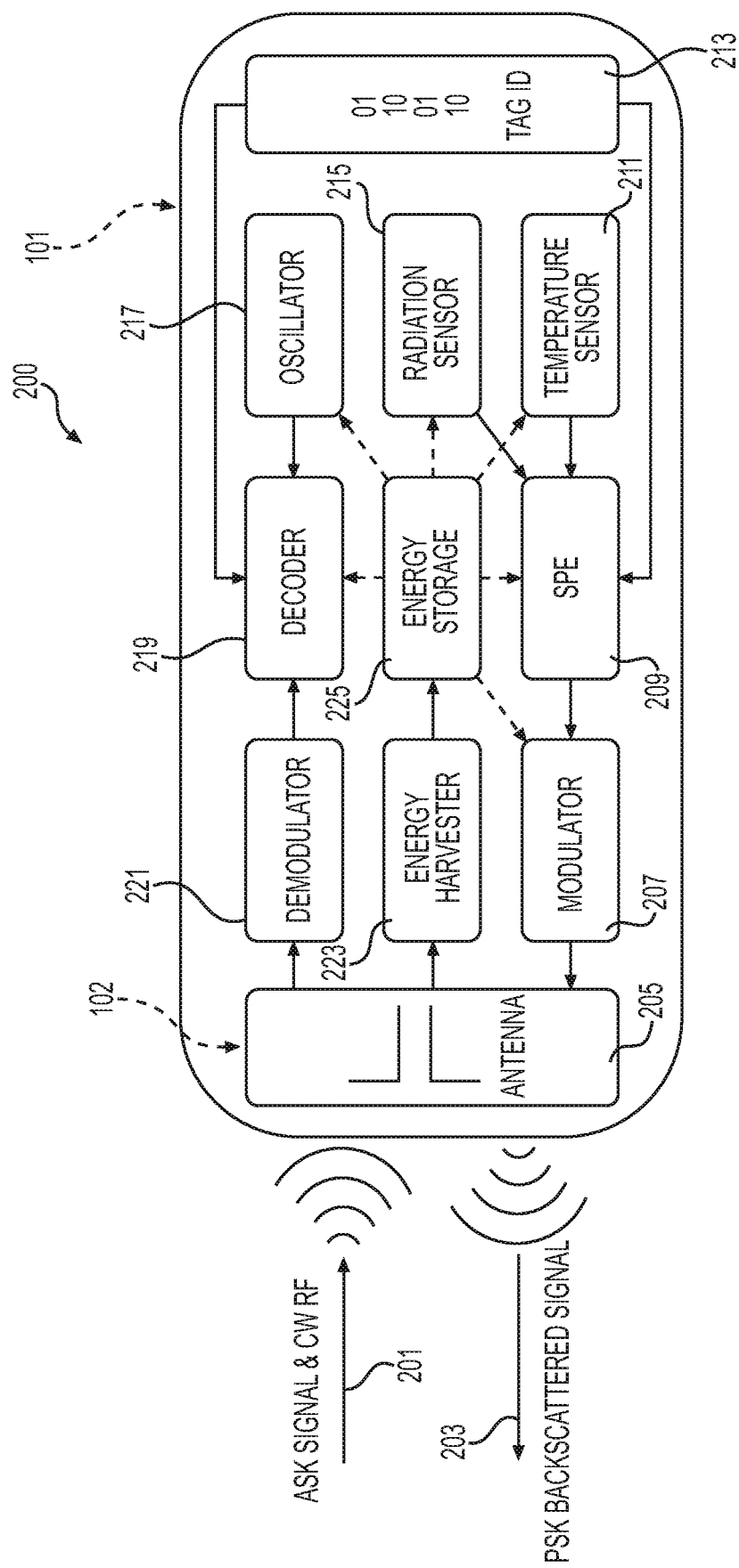
FIG. 2 is a system-level diagram illustrating an embodiment of a wireless dosimeter chip-enabled tag having a predetermined ID value associated with an AMC-backed flexible antenna and the sub-modules of the wireless dosimeter chip-enabled tag, according to the present invention.

FIG. 2 is a system-level diagram illustrating an embodiment of a wireless dosimeter chip-enabled tag 101 having a predetermined ID value associated with an embodiment of the AMC-backed flexible antenna 102 and the sub-modules of the wireless dosimeter chip-enabled tag 101. In the exemplary embodiment of FIG. 2, there is illustrated the system-level diagram of a RFID wireless dosimeter chip-enabled tag 200 and its sub-modules, as an exemplary embodiment of the wireless dosimeter chip-enabled tag 101, and as implemented in a 130 nanometer (nm) complementary metal oxide semiconductor (CMOS) process, for example. The dosimeter of the RFID wireless dosimeter chip-enabled tag 200 is realized in a semi-passive RFID (radio frequency identification) tag configuration employing backscatter and a wireless RF energy harvesting module for low-power operation and low-form factor.

The wireless dosimeter chip-enabled tag 200 is uniquely identified by an ID value which is desirably hard-coded into the tags integrated circuit (IC). The wireless dosimeter chip-enabled tag 200 includes an AMC-backed antenna 205, as an exemplary embodiment of the AMC-backed antenna 101, to receive an ASK signal 201 and to transmit a PSK backscattered signal 203. The ASK signal 201, such as a constant wave radio frequency (CW RF) signal, is transmitted via the AMC-backed antenna 205 to a demodulator 221 to demodulate the received ASK signal 201 and is coupled with a decoder 219 to decode the received ASK signal 201 and an oscillator 217 to generate signals for operation of the wireless dosimeter chip-enabled tag 200. The decoder 219 is in communication with a Tag ID 213, which includes a unique or predetermined ID value associated with the wireless dosimeter chip-enabled tag 200. The TAG ID 213 is in communication with a signal processing engine (SPE) 209, or other suitable processor, including or associated with a memory for programs, instructions or data storage for operation and control of the wireless dosimeter chip-enabled tag 200, such for processing, transmitting or receiving requests, data or information in or by the wireless dosimeter chip-enabled tag 200. The SPE 209 is coupled to a modulator 207 which modulates and formats an information or data signal, such as the PSK backscatter signal 203, for transmission from the AMC-backed antenna 205 to a receiver, such as to the dosimeter reader 117.

The wireless dosimeter chip-enabled tag 200 further desirably includes a temperature sensor 211 to sense the temperature of an object, fluid or other medium associated with the wireless dosimeter chip-enabled tag 200, such as blood in the blood bag 105 being irradiated, an energy harvester 223 which harvests the energy from the received ASK signal 201 which is in communication with an energy storage module 225 to store the energy from the received ASK signal 201, which is in turn in communication with a radiation sensor 215 to sense an amount of radiation delivered to an object, such as blood in the blood bag 105. The components of the wireless dosimeter chip-enabled tag 200 are communicatively associated with each other through the SPE 209 to perform the functions and operations of the wireless dosimeter chip-enabled tag 200, such as to determine an amount of radiation delivered to the blood bag 105. The wireless dosimeter chip-enabled tag 200 associated with the AMC-backed antenna 205 can be modified to perform other applications, as can utilize similar components to those described and additional components for such other applications, for example. To communicate with a specific wireless dosimeter chip-enabled tag 200, a reader, such as the dosimeter reader 117, transmits the ASK signal 201, such as an ultra-high frequency (UHF) 2.45 GHz ASK-modulated signal 201, containing the unique or predetermined ID value of the wireless dosimeter chip-enabled tag 200 it wishes to interrogate for data or information, such as the amount of radiation delivered to blood in a specific blood bag 105, for example.

For example, each wireless dosimeter chip-enabled tag 200, such as the wireless dosimeter chip-enabled tag 101 inside the irradiation apparatus 113, such as the Raycell Mk2 irradiator, demodulates the RF signal received through the AMC-backed antenna 205 and compares the received ID value to its own unique or predetermined ID value. If the ID values match, the wireless dosimeter chip-enabled tag 200 transmits its predetermined ID value from the tag ID 213, a sensed X-ray dose from the radiation sensor 215, and measured temperature from the temperature sensor 211 through the AMC-backed antenna 205 to a receiver, such as the dosimeter reader 117, using backscatter modulation. For example, the dosimeter reader 117 establishes a backscatter link by broadcasting a 2.45 GHz CW carrier tone as the ASK signal 201. During uplink communication, the specified wireless dosimeter chip-enabled tag 200 modulates its data, such as radiation, temperature and the predetermined ID value, onto this CW carrier signal using PSK modulation, and reflects the signal as the PSK backscattered signal 203 back to the dosimeter reader 117. Desirably, the interrogation of the wireless dosimeter chip-enabled tag 200, and the transmission and reception communications, are carried out using embodiments of the AMC-backed antenna, such as the AMC-backed antenna 205 operating at 2.45 GHz, for example.

For an AMC-backed antenna, such as the AMC-backed antenna 205, an ideal AMC desirably should be arranged to form an infinite surface, but such arrangement is, however, impractical due to practical limitations. Therefore, in embodiments of the AMC-backed antenna, such as the AMC-backed antenna 205, it is desirable to optimize a number of AMC unit cells to be used in an antenna design. Therefore, in the design of an AMC-backed antenna, a number of AMC unit cells for the AMC-backed antenna desirably should be optimized to provide a compact configuration that boosts the gain of the antenna while maintaining good radiation characteristics, as can depend on the use or application, for example.

Figure 3:
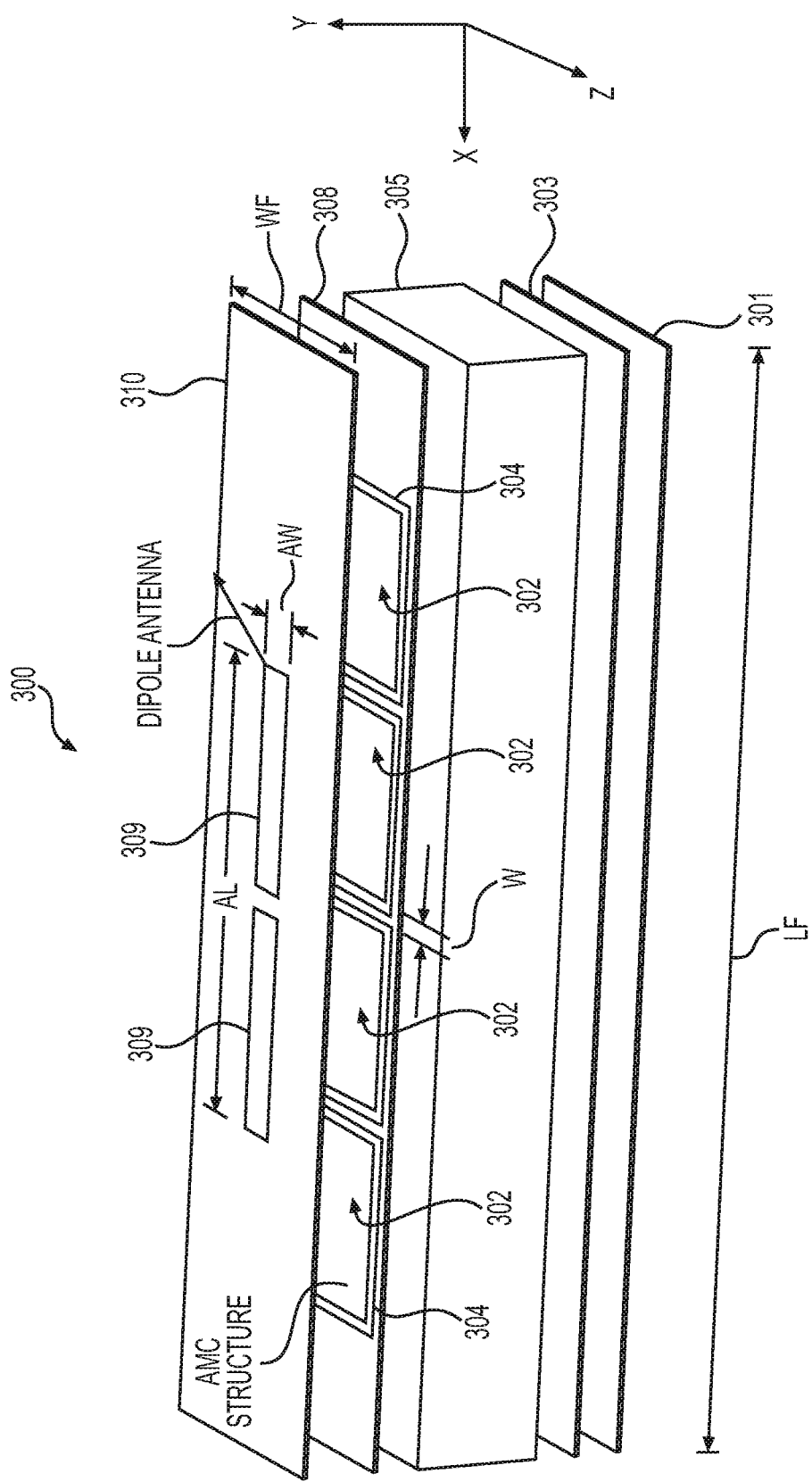
FIG. 3 shows a layout of an embodiment of an AMC-backed dipole antenna according to the present invention.

FIG. 3 shows a layout of an embodiment of an AMC-backed dipole antenna 300 and an exemplary design of the AMC unit cells. An AMC's performance is typically indicated by its reflection phase, reflection coefficient and bandwidth. An ideal AMC completely reflects the incident signal with no phase change at its operating frequency, that is $S_{11}=1\angle 0°$. The AMC-backed dipole antenna 300 includes at least one AMC unit cell 302 associated with a suitable antenna, such as a dipole antenna 309, and the AMC-backed dipole antenna 300 in an embodiment for blood irradiation measurement applications desirably has an overall length LF of 100 mm and an overall width WF of 20 mm (100 mm by 20 mm).

The dipole antenna 309, such as for blood irradiation measurement applications, desirably is a 2.45 GHz dipole having an overall length AL of 38.5 mm and a width AW of 3.75 mm (38.5 mm by 3.75 mm) placed over or on a suitable dielectric layer 310 surface, desirably a 100 mm by 20 mm surface of Kapton® or other suitable flexible film, as can depend on the use or application, for example. To preserve flexibility, the dipole antenna desirably is inkjet-printed on a Kapton® 0.12 mm thick dielectric layer 310 using a silver nanoparticle ink. Also, the AMC-backed dipole antenna 300 desirably includes a plurality of AMC unit cells 302 arranged in a plurality of square loop cells and arranged in an n rows×m columns array on the top layer of the AMC in the AMC-backed dipole antenna 300. Desirably, a one by four array of AMC unit cells 302 are illustrated in the AMC-backed dipole antenna 300 of FIG. 3, as can be desirable for blood irradiation measurements. The AMC unit cells 302 are desirably square loop cells and are desirably spaced at a distance "W" of at least 1 mm apart from each other in the AMC-backed dipole antenna 300, although the number, configurations, dimensions and spacing of the AMC unit cells can depend on the use or application and should not be construed in a limiting sense.

Desirably, each of AMC unit cells 302 has a metallization pattern 304, such as formed by a suitable conductive material, such as a conductive ink, and is desirably of a square loop design on a suitable dielectric material, such as Kapton® or other suitable flexible film. In embodiments of the AMC-backed dipole antenna 300, a loop configuration for the metallization pattern 304 is used rather than a patch AMC design to facilitate reducing the foam thickness of a foam spacer 305 required for AMC operation at 2.45 GHz and to ensure the least possible amount of ink is used. The foam material for the foam spacer 305 desirably is a polymeric foam material in solidified form, formed from polymers, such as, for example, polyurethane (PUR or PU) foam, or other suitable foam materials as can depend on the use or application, and should not be construed in a limiting sense.

The foam spacer 305 for the square loop AMC unit cell(s) 302 desirably is a 9 millimeter (mm) thick foam spacer 305 between two dielectric layers, a top dielectric layer 308 adjacent to or integral with the dielectric layer 310 and a bottom dielectric layer 303. The top dielectric layer 308 and the bottom dielectric layer 303 are formed of a suitable dielectric material, such as Kapton® or other suitable flexible film. Desirably, each square loop AMC unit cell 302 includes the 9 mm thick foam spacer 305, between the top dielectric layer 308 and the bottom dielectric layer 303 each of Kapton®, or other suitable polyimide material, and the top dielectric layer 308 and the bottom dielectric layer 303 each having a dielectric constant $\varepsilon_r=3.5$ and a loss tangent tan $\delta=0.02$, for example.

The AMC-backed dipole antenna 300 also includes a conductive ground plane layer 301 that also forms a bottom layer of each AMC unit cell 302. The ground plane layer 301 includes a conductive material, metallization or metallization pattern, desirably formed on a bottom surface of the bottom dielectric layer 303, such as of Kapton®, to provide a ground. The bottom dielectric layer 303 as a substrate layer is desirably formed of a suitable material, such as of Kapton®, or other suitable polyimide material, with the conductive material, metallization or metallization pattern of the ground plane layer 301 at the bottom desirably formed of a suitable conductive material, such as a conductive ink, for example, to provide a ground. In embodiments of the AMC-backed dipole antenna 300 and in each AMC-backed unit cell 302, to preserve flexibility, all metallization patterns or metallization of the metallization pattern 304, such as of the square loop, and of the conductive material, metallization or metallization pattern of the ground plane 301, and the arms of the dipole antenna 309 are desirably inkjet-printed on the appropriate Kapton® sheets (4,4'-oxydiphenylene-pyromellitimide) or on sheets of other suitable polyimide material, using silver nanoparticle ink of conductivity $\sigma=1\times 10^7$ Siemens per meter (S/m).

FIG. 4A shows a top view of an embodiment of a 2.45 GHz AMC square loop unit cell 302 and FIG. 4B shows a side view of the embodiment of the 2.45 GHz square loop unit cell 302 illustrated in FIG. 4A, according to the present invention. The embodiment of the AMC square loop unit cell 302 in FIG. 4A desirably has a generally square configuration, although other suitable configurations can be used, as can depend on the use or application, and has a side length LU of 20 mm. The metallization pattern 304, desirably of a square configuration as illustrated in FIG. 4A, desirably has an overall length from one outer side to an opposite outer side LM of 18 mm and a width LW of the pattern of 1 mm, for example, although the configurations, dimensions and shapes of the metallization pattern can be other of suitable configurations, dimensions and shapes.

In the side view of the embodiment of the 2.45 GHz square loop unit cell 302 of FIG. 4B, there is illustrated the metallization pattern 304 on the top dielectric layer 308 adjacent to or integral with the dielectric layer 310 and the bottom dielectric layer 303, with the foam spacer 305 between the dielectric layers 308/310 and the dielectric layer 303. Desirably, the foam spacer 305 has a thickness LF of 9 mm, for example, such as for use in blood irradiation applications, although the foam spacer 305 can be of other suitable thicknesses, as can depend on the use or application. In the illustration of FIG. 4B of the AMC square loop unit cell 302, the ground plane layer 301 having the conductive material, metallization or metallization pattern positioned adjacent the dielectric layer 303 completes the schematic illustration of the AMC square loop unit cell 302 structure. As shown in FIG. 3, the AMC structure desirably includes a plurality of AMC square loop unit cells 302, which are arranged in n×m arrays; n rows by m columns. such as an array of 1×4 AMC unit cells 302, each having the structure illustrated in and described with respect to FIGS. 4A and 4B, for example.

Figure 5:
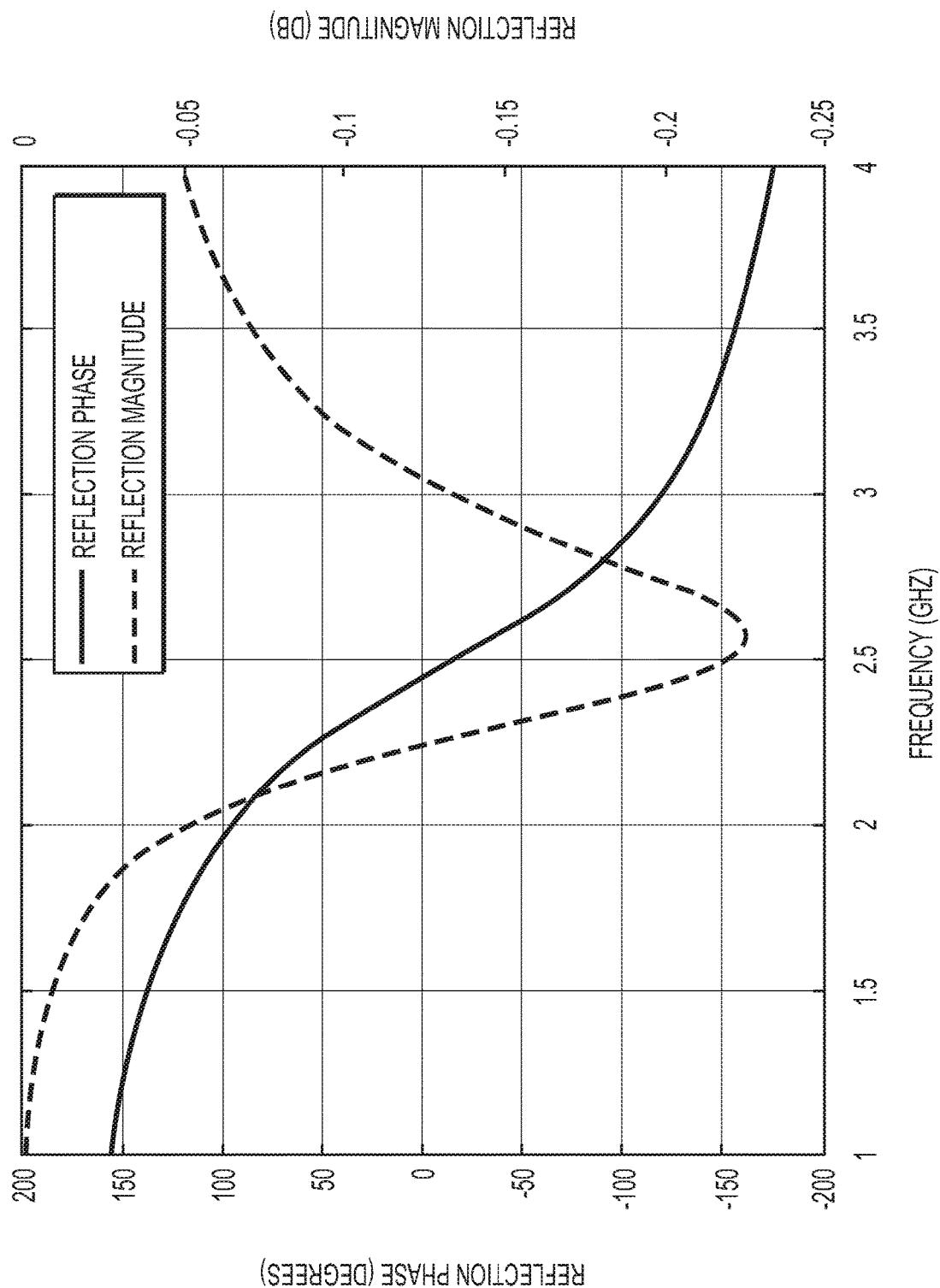
FIG. 5 depicts a graphic representation of a reflection phase and a magnitude response of an embodiment of a simulated AMC unit cell for a normal incident plane wave, according to the present invention.

FIG. 5 depicts a graphic representation of a reflection phase and a magnitude response of an embodiment of a simulated AMC unit cell, such as an AMC square loop unit cell 302 for a normal incident plane wave. In an exemplary embodiment, when impinged by an RF signal at 2.45 GHz, the AMC square loop unit cell has a reflection response shown in FIG. 5, for example. FIG. 5 illustrates the reflection phase and magnitude response of the simulated AMC unit cell for a normal incident plane wave. The AMC unit cell has a reflection magnitude and phase of −0.21 dB and 0.160 dB, respectively, and a bandwidth from 2.29 GHz to 2.61 GHz (320 MHz). This bandwidth is defined as the frequencies where the reflection phase falls within ±45. Within these frequencies, the image currents are in-phase with the incident currents, hence the incident and reflected waves are not subjected to significant destructive interference. As a result, the antenna elements can lie directly on the top of the AMC unit cell surface without being shorted out.

Figure 6:
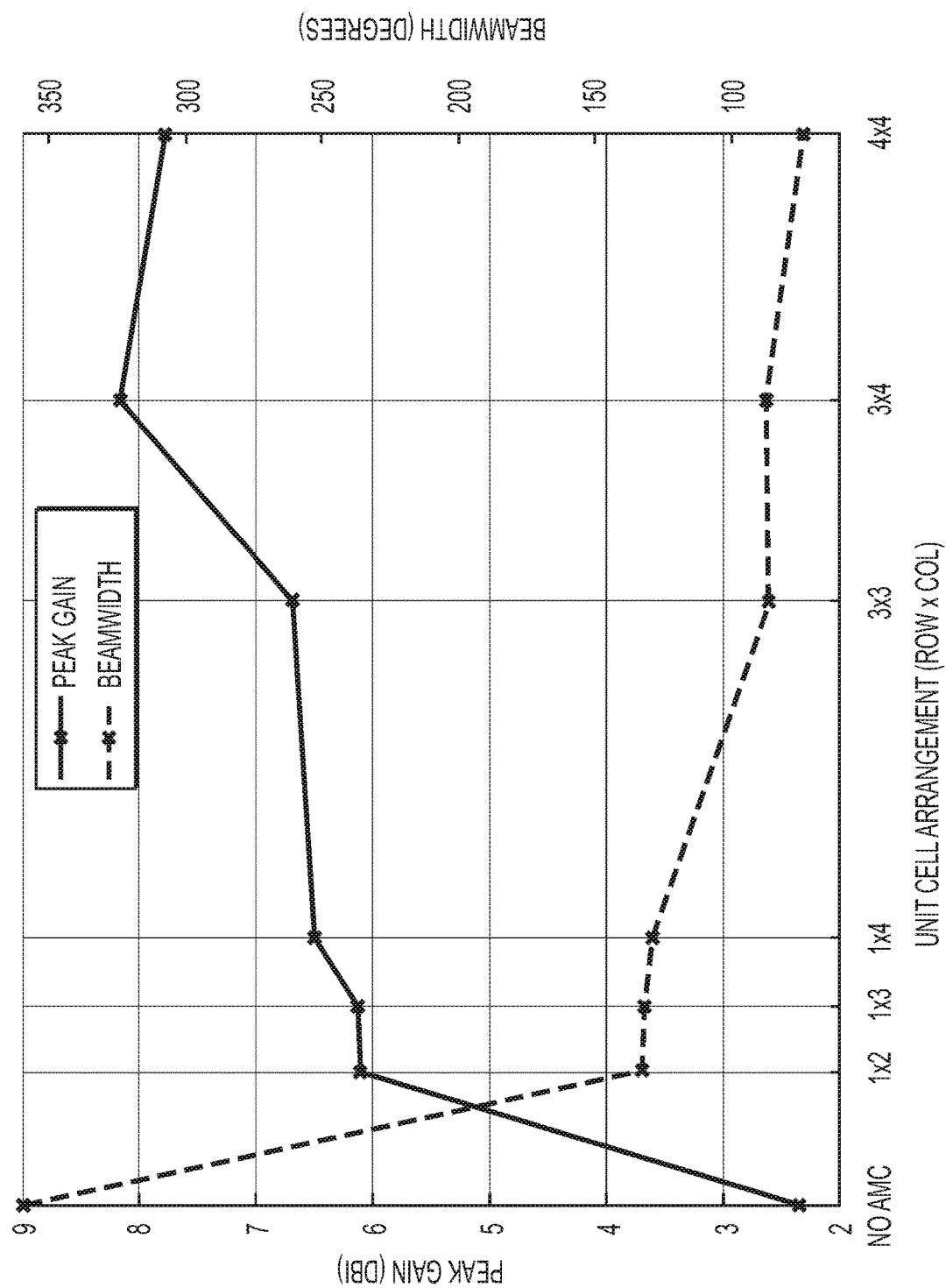
FIG. 6 depicts a graphic representation of a simulated peak gain and a beam width at 2.45 GHz with increasing unit cells for an embodiment of an initial dipole-AMC-backed antenna structure, according to the present invention.

FIG. 6 depicts a graphic representation of a simulated peak gain and a beam width at 2.45 GHz with increasing an amount of AMC unit cells for an embodiment of an initial dipole-AMC-backed antenna structure. The antenna is simulated to study its impedance and radiation characteristics for different numbers of AMC unit cells. For example, the variation in the simulated gain and beam width of the dipole antenna design for different AMC unit cell configurations is shown in FIG. 6. From the graph of FIG. 6, it is evident that as the number of unit cells increases, the antenna gain improves, as expected. However, this trend in the antenna gain ceases beyond 3×4 unit cells, with the gain decreasing. Consequently, the antenna beam width narrows with the increasing number of unit cells. This decrease in beam width can be attributed to the increased directivity and gain as the AMC surface approaches a near ideal case.

Figure 7:
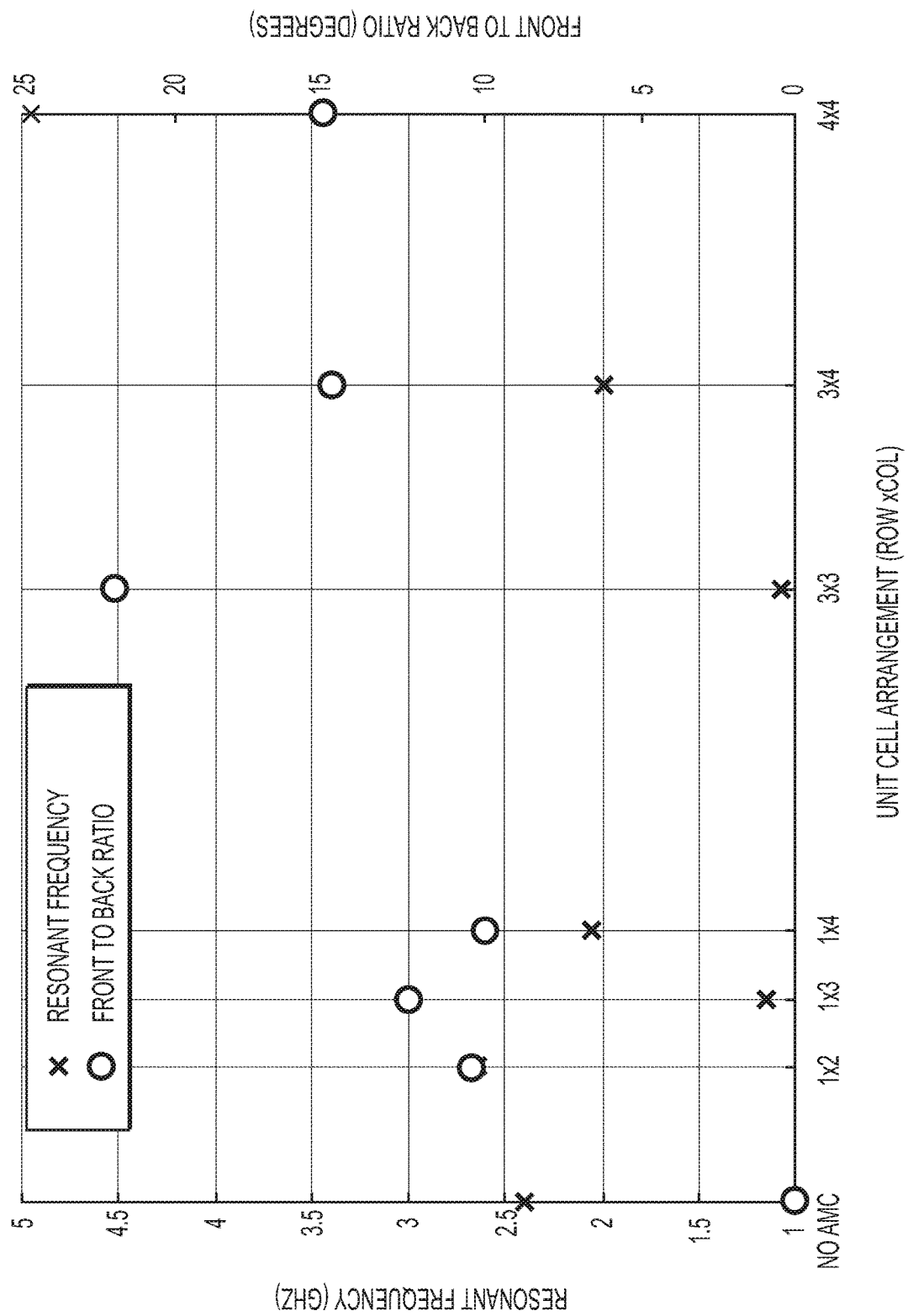
FIG. 7 shows a graphic representation of a simulated resonant frequency and a front-to-back ratio at 2.45 GHz with increasing number of AMC unit cells for the embodiments of initial dipole-AMC antenna structures, according to the present invention.

FIG. 7 shows a graphic representation of a simulated resonant frequency and a front-to-back ratio at 2.45 GHz with increasing number of AMC unit cells for the embodiments of initial dipole-AMC antenna structures. A slight shift in the antenna's resonant frequency is observed in FIG. 7 when the AMC unit cell is introduced. This can be attributed to the parasitic capacitance introduced by the gap between the dipole antenna and the AMC unit cells. Based on these results, as illustrated in FIG. 7, the 1×4 unit cell array of AMC unit cells is desirable for the AMC structure, since it offers a low profile with considerable gain, sufficient beam width, broadside radiation and, desirably, its dimensions complement the dipole antenna associated with the AMC unit cells. The front-to-back ratio and the resonant frequency of the design are also shown in FIG. 7.

Figure 8:
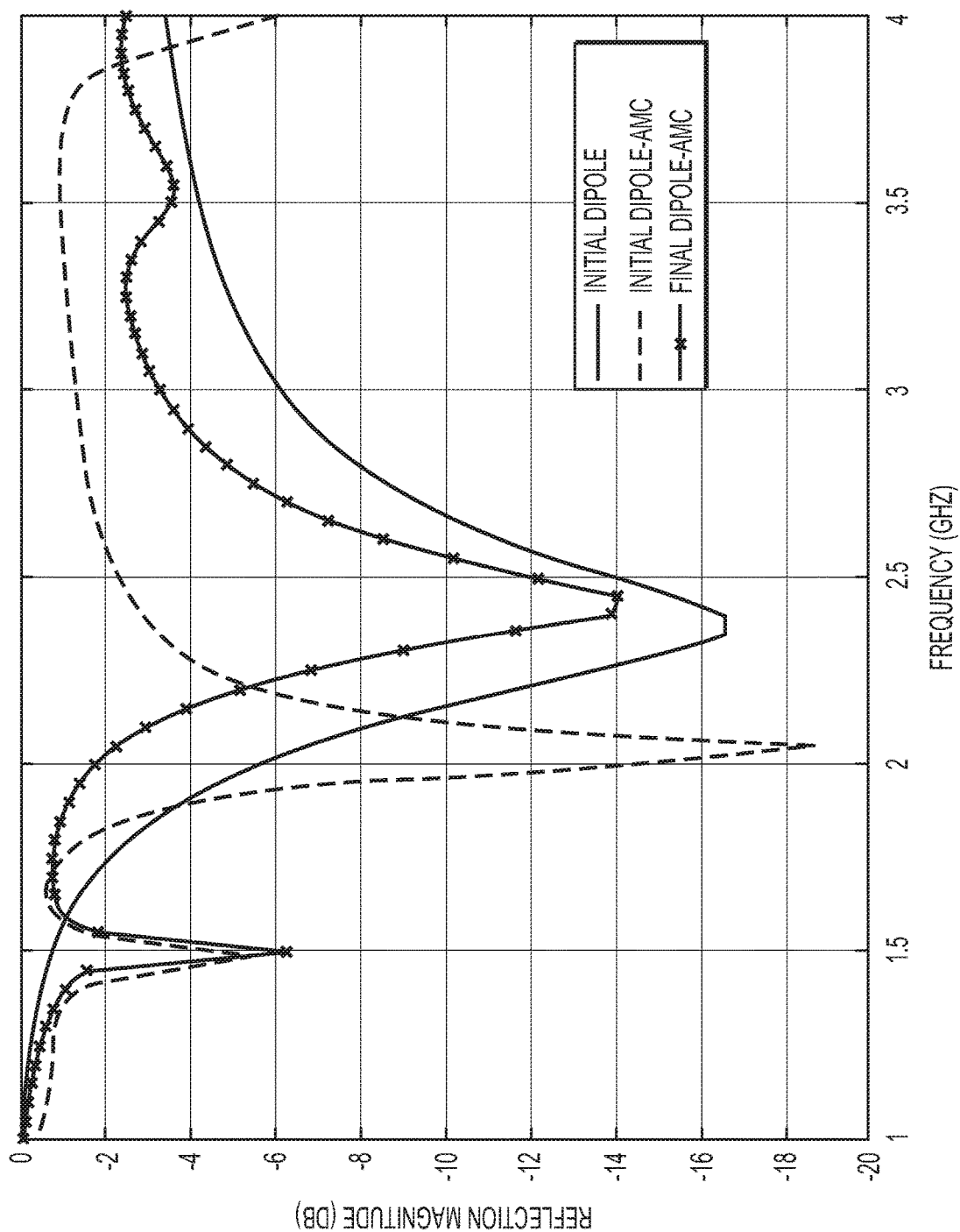
FIG. 8 shows a graphic representation of simulated return loss, $S_{11}$, illustrating a reflection magnitude and a frequency for an initial dipole in free space, and for embodiments of an initial dipole-AMC antenna structure and a final dipole-AMC antenna structure, according to the present invention.

FIG. 8 shows a graphic representation of simulated return loss, $S_{11}$, illustrating a reflection magnitude and a frequency for an initial dipole in free space, and for embodiments of an initial dipole-AMC antenna structure and a final dipole-AMC antenna structure. The simulated impedance performance, in FIG. 8, shows a change in the antenna's bandwidth from 20.4% to 9.8% and the resonant frequency shifts from 2.45 GHz to 2.05 GHz without and with the AMC antenna structure, respectively. To compensate for the change in the antenna resonant frequency and to adequately match the antenna structure to the feed, the initial dipole length is shortened from 57 mm to 38.5 mm (final design). A reduction in the bandwidth of the antenna is caused by the AMC structure which is the limiting factor in the design of the AMC structure.

Figure 9A:
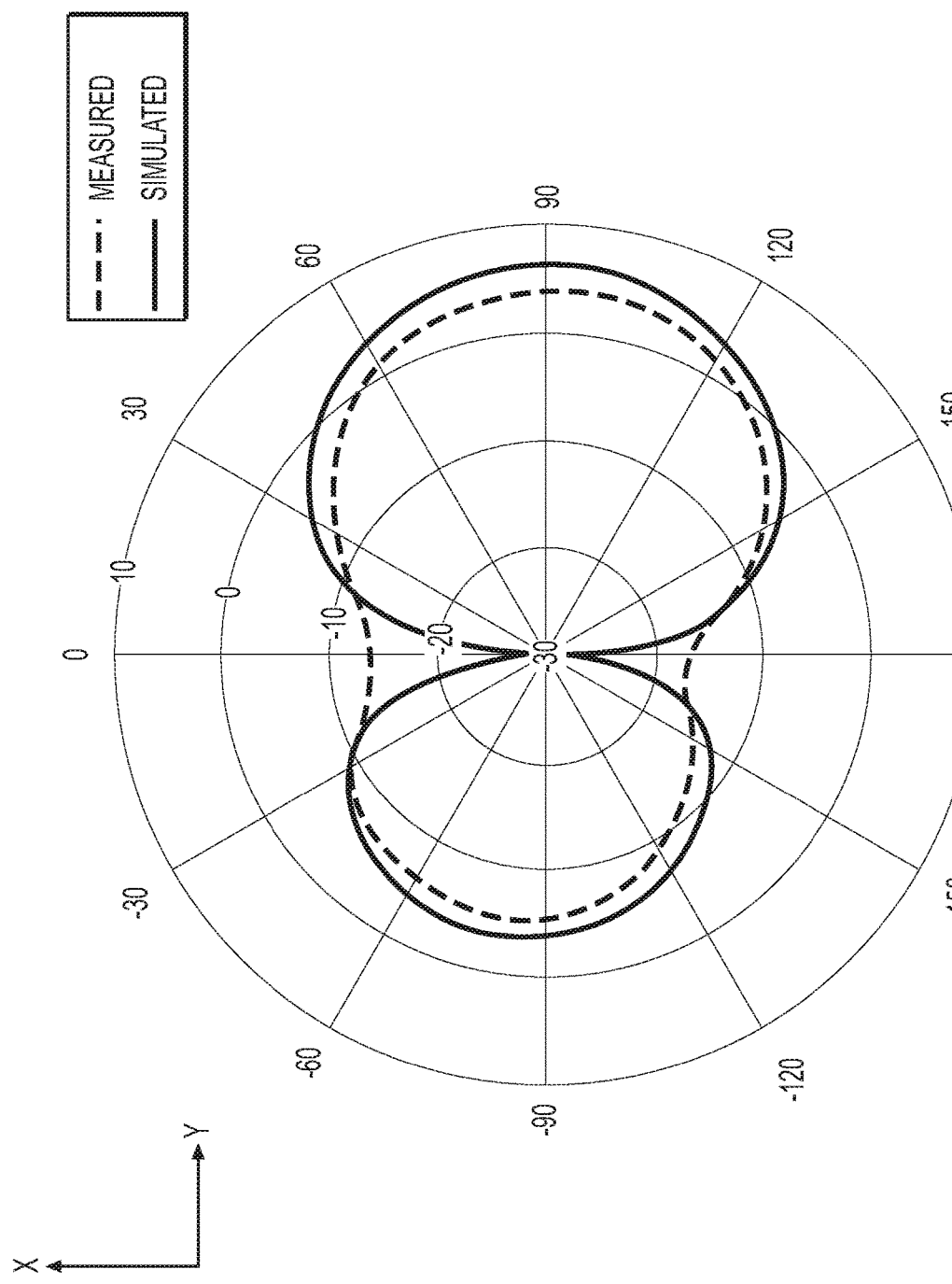
FIG. 9A shows a representation of a simulated radiation pattern and a measured radiation pattern of an embodiment of an AMC-backed dipole antenna in the E-plane (XY), at 2.45 GHz, according to the present invention.

Referring now to FIGS. 9A and 9B, FIG. 9A shows a representation of a simulated radiation pattern and a measured radiation pattern of an embodiment of an AMC-backed dipole antenna in the E-plane (XY), at 2.45 GHz and FIG. 9B shows a representation of a simulated radiation pattern and a measured radiation pattern of the embodiment of the AMC-backed dipole antenna of FIG. 9A in the H-plane (YZ) at 2.45 GHz. In order to verify the flexibility of an embodiment of a fabricated AMC-backed antenna, such as the AMC-backed dipole antenna 300 having the 2.45 GHz square loop unit cells 302, the AMC-backed antenna structure has been characterized in a planar mode and under bending by placing it on a curved foam surface. The radiation performance of the AMC-backed antenna under these conditions is measured using a Satimo StarLab anechoic chamber. The simulated and measured radiation patterns under planar conditions in the E and H planes at 2.45 GHz are illustrated in FIGS. 9A and 9B where the dashed line represent the measured pattern and the bold line represent the simulated pattern.

It can be observed that embodiments of the dipole-AMC structure significantly reduce back radiation compared to the performance of a conventional dipole antenna, which radiates with an omnidirectional pattern. Under planar conditions, simulated and measured gains of 6.38 dBi (decibels relative to isotropic radiator) and 4.37 dBi are obtained from the antenna in the broadside direction, respectively. At 2.45 GHz, the fabricated antenna exhibits a front-to-back ratio of 8.42 dB, thereby adequately isolating the antenna from its host structure.

Figure 10:
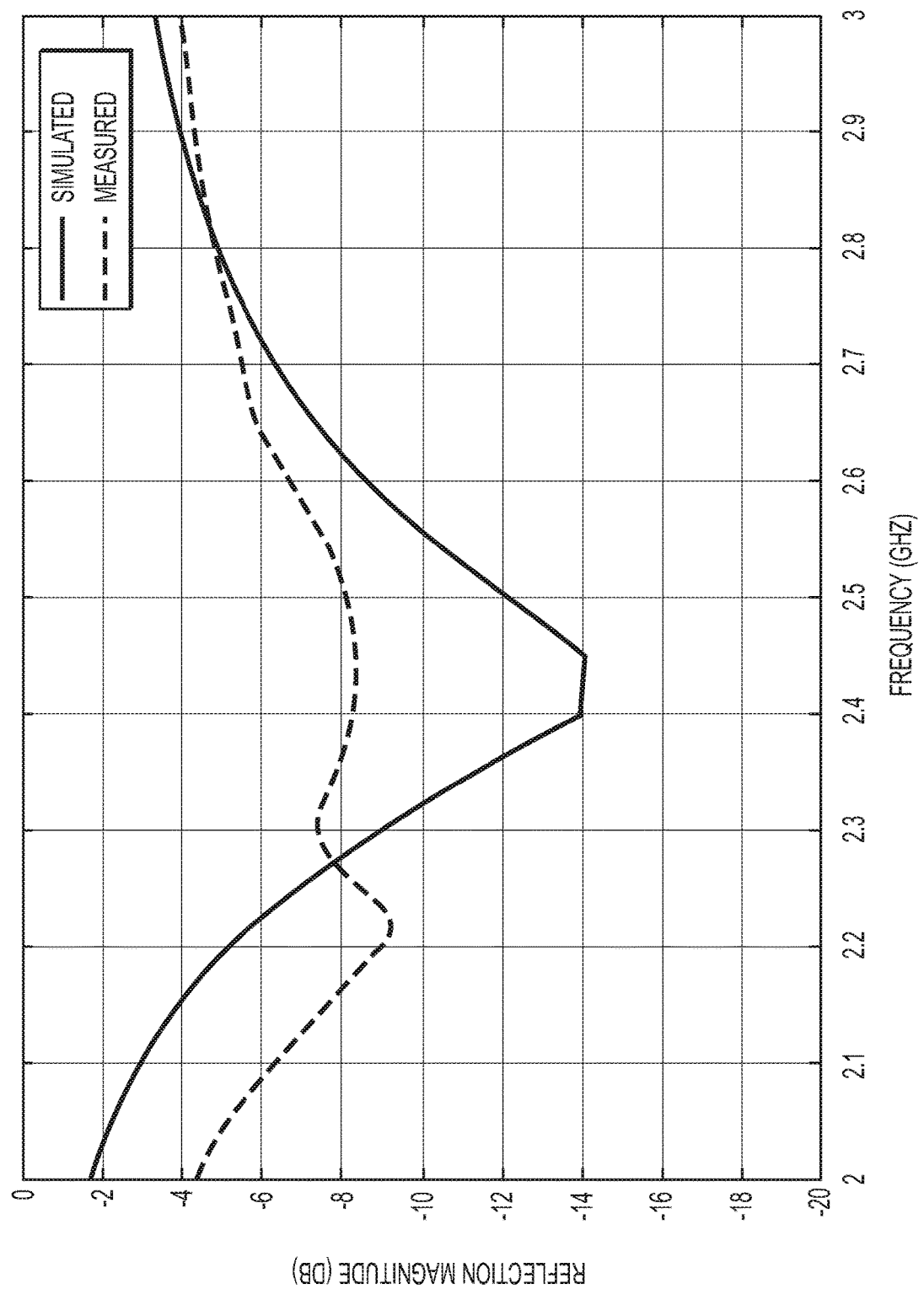
FIG. 10 shows a graphical representation of a simulated and a measured return loss, $S_{11}$, illustrating a reflection magnitude and a frequency for an embodiment of an AMC-backed dipole antenna, according to the present invention.

For example, FIG. 10 shows a graphical representation of a simulated and a measured return loss, $S_{11}$, illustrating a reflection magnitude and a frequency for an embodiment of an AMC-backed dipole antenna. A comparison between the simulated and measured S-parameters of the AMC-backed dipole antenna is shown in FIG. 10 where the dashed lines represent the measured values and the solid line represents the simulated result. For a −8 dB (decibel) impedance bandwidth, measured $S_{11}$ shows the AMC-backed dipole antenna has a bandwidth ranging from 2.16 GHz to 2.52 GHz (14.6%) in the planar configuration, for example.

Figure 11:
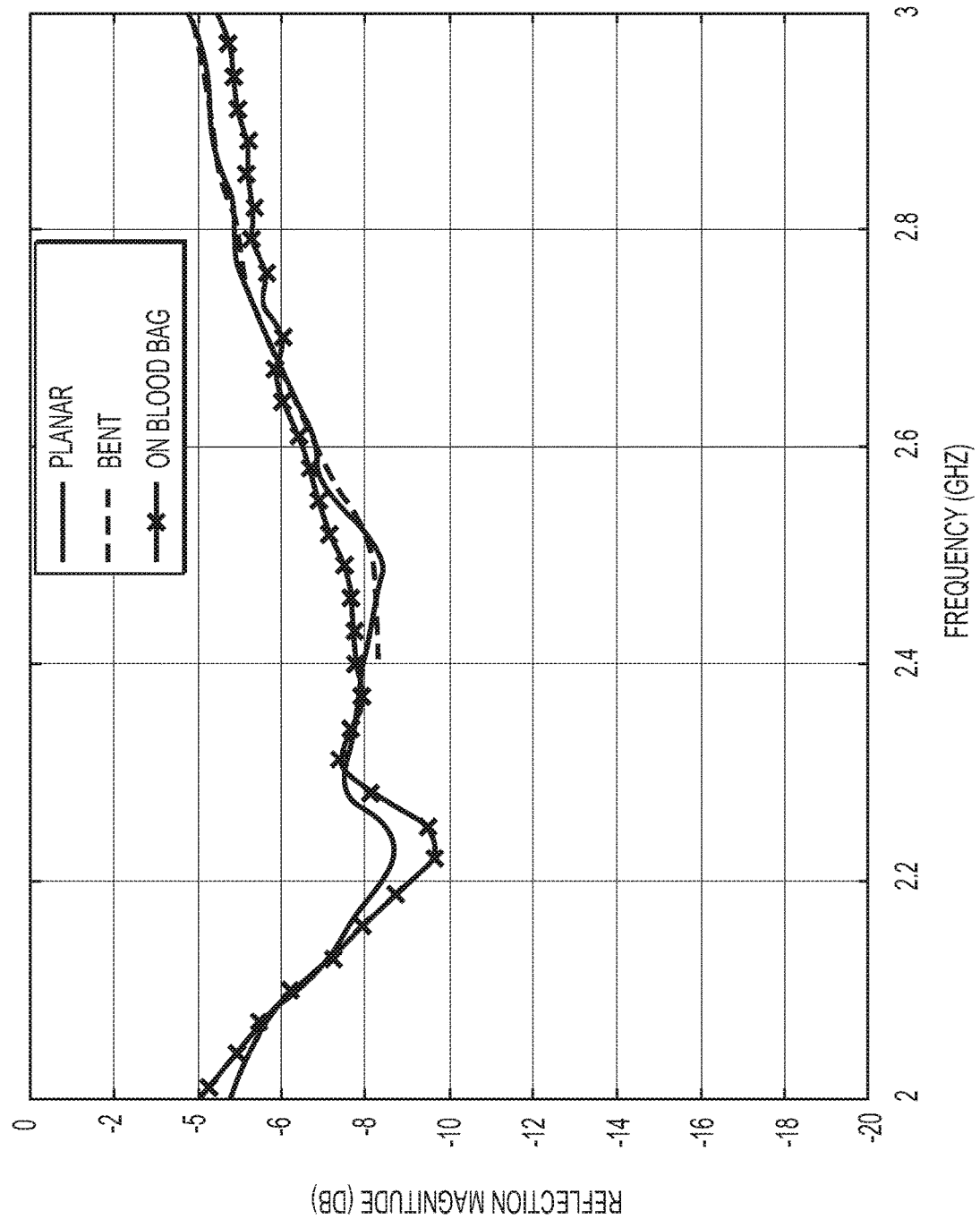
FIG. 11 shows a graphical representation of a measured return loss, $S_{11}$, illustrating a reflection magnitude and a frequency for an embodiment of an embodiment of an AMC-backed dipole antenna under different conditions, according to the present invention.
Figure 12A:
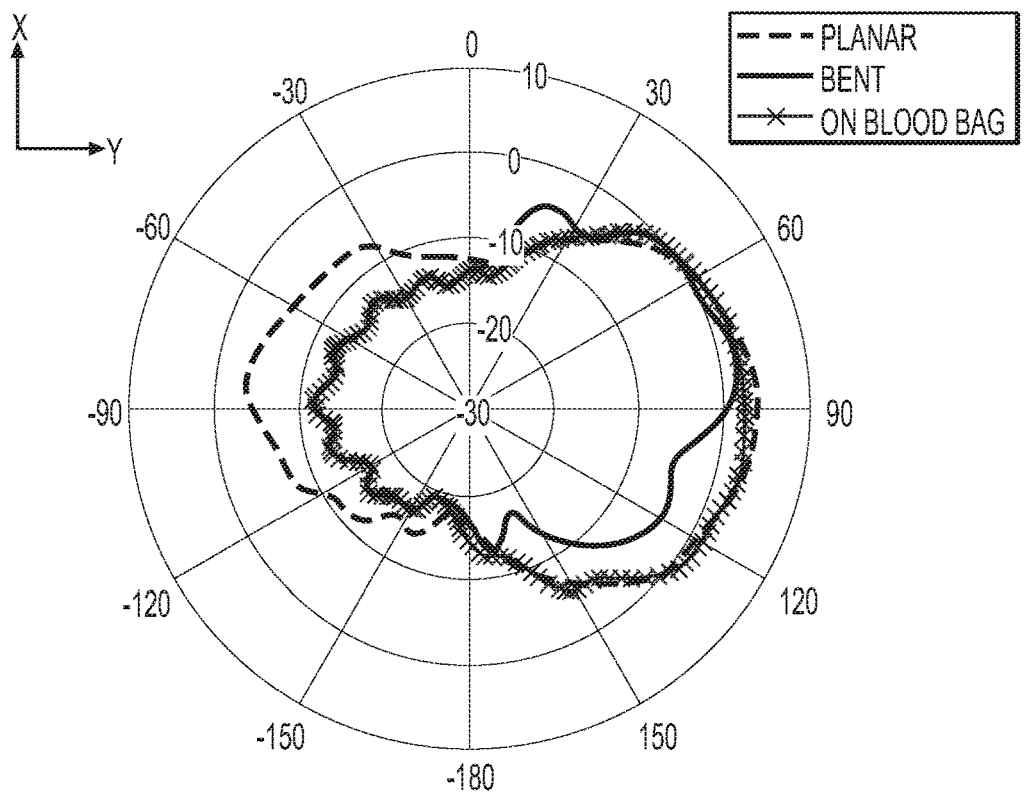
FIG. 12A shows a representation of measured radiation patterns of an embodiment of an AMC-backed dipole antenna in the E-plane (XY) at 2.45 GHz under different conditions, according to the present invention.
Figure 12B:
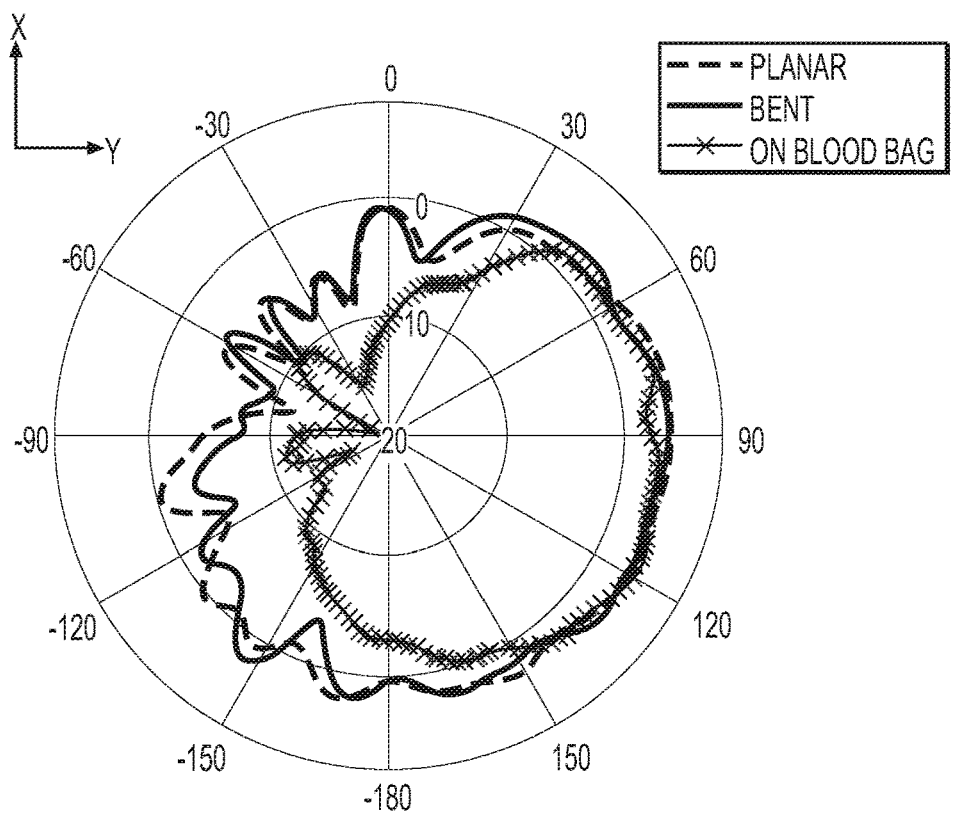
FIG. 12B shows a representation of measured radiation patterns of an embodiment of an AMC-backed dipole antenna of FIG. 12A in the H-plane (YZ) at 2.45 GHz under different conditions, according to the present invention.

FIG. 11 shows a graphical representation of a measured return loss, $S_{11}$, illustrating a reflection magnitude and a frequency for an embodiment of an embodiment of an AMC-backed dipole antenna under different conditions, such as where the AMC-backed antenna structure is in planar and bent conditions and on a blood bag. FIG. 12A shows a representation of measured radiation patterns of an embodiment of an AMC-backed dipole antenna in the E-plane (XY) at 2.45 GHz and FIG. 12B shows a representation of measured radiation patterns of an embodiment of an AMC-backed dipole antenna of FIG. 12A in the H-plane (YZ) at 2.45 GHz under different conditions, such as where the AMC-backed antenna structure is in planar and bent conditions and on a blood bag. However, as illustrated in FIG. 11, FIG. 12A and FIG. 12B, under bending, the measured S-parameters and radiation pattern of the AMC-backed antenna remain the same as the planar case. This is a highly desirable characteristic of any passive microwave component geared toward flexible applications in that its performance does not change with bending of the AMC-backed antenna structure, such as when applied to blood irradiation measurement applications, for example.

Figure 14:
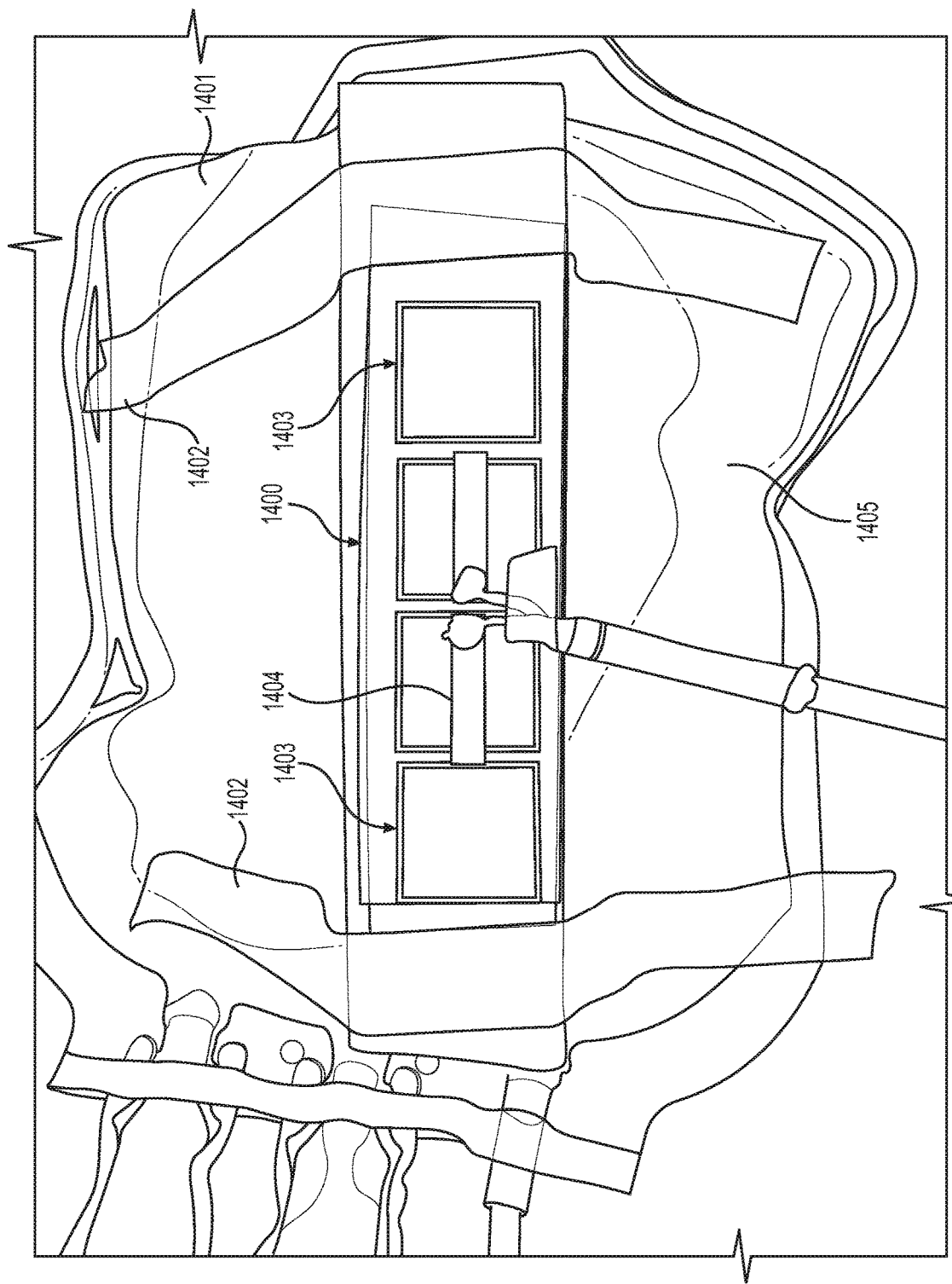
FIG. 14 shows an embodiment of a fabricated AMC-backed dipole antenna affixed to a blood bag containing a blood mimicking solution, according to the present invention.

Referring now to FIG. 14, there is illustrated in FIG. 14 an embodiment of a fabricated AMC-backed dipole antenna affixed to a blood bag containing a blood mimicking solution. In the exemplary embodiment shown in FIG. 14, an AMC-backed dipole antenna structure 1400, similar in components and construction to the AMC-backed dipole antenna 300, as described herein, is then placed on a filled bag member or blood bag 1401, such as by being taped by a suitable tape 1402 to the bag member or blood bag 1401. The AMC-backed dipole antenna structure 1400 includes a one by four array of AMC unit cells 1403, similar in components and construction to the AMC unit cells 302, as described herein, and a dipole antenna 1404, similar to the dipole antenna 309. The bag member or blood bag 1401 has inside it a blood mimicking solution 1405 to study the effects of lossy host structures on the AMC-backed antenna performance. For antenna testing, a solution mimicking blood's permittivity and loss tangent at 1.5 GHz ($\varepsilon_r$=59.62, $\sigma$=1.836 S/m, tan $\delta$=0.3689) is prepared using ethanol ($\varepsilon_r$=25), sodium chloride and water ($\varepsilon_r$=81), as the blood mimicking solution 1405. The electrical properties of the blood-like solution 1405 were measured using SPEAG's dielectric assessment kit at 1.5 GHz due to the limited frequency range of the available kit. The dielectric properties of the solution are expected not to change significantly at 2.45 GHz.

In the presence of the bag member or blood bag 1401 and the blood mimicking solution 1405, the measured impedance and radiation characteristics of the AMC-backed antenna structure 1400 are shown in FIGS. 11, 12A and 12B, respectively. The measured results in FIGS. 11, 12A and 12B for the AMC-backed antenna structure 1400 on the bag member or blood bag 1401 with the blood mimicking solution 1405 show that the AMC-backed antenna structure 1400 reflection coefficient remains relatively unchanged from 2 GHz to 3 GHz regardless of the bending condition or the presence of blood in the form of the blood mimicking solution 1405 (a lossy host structure), with a variation of ±0.7 dB. The measured far field gain results show that the AMC-backed antenna structure 1400 maintains a broadside gain of 4.75 dBi and 4.08 dBi under bending and on a blood bag, such as the bag member or blood bag 1401, respectively, thereby exhibiting no significant change in the antenna performance of the AMC-backed antenna structure 1400. These results validate the use of an AMC-backed antenna structure under the antenna to isolate it from the lossy environment, such as on a blood bag filled with blood, for example.

Figure 13:
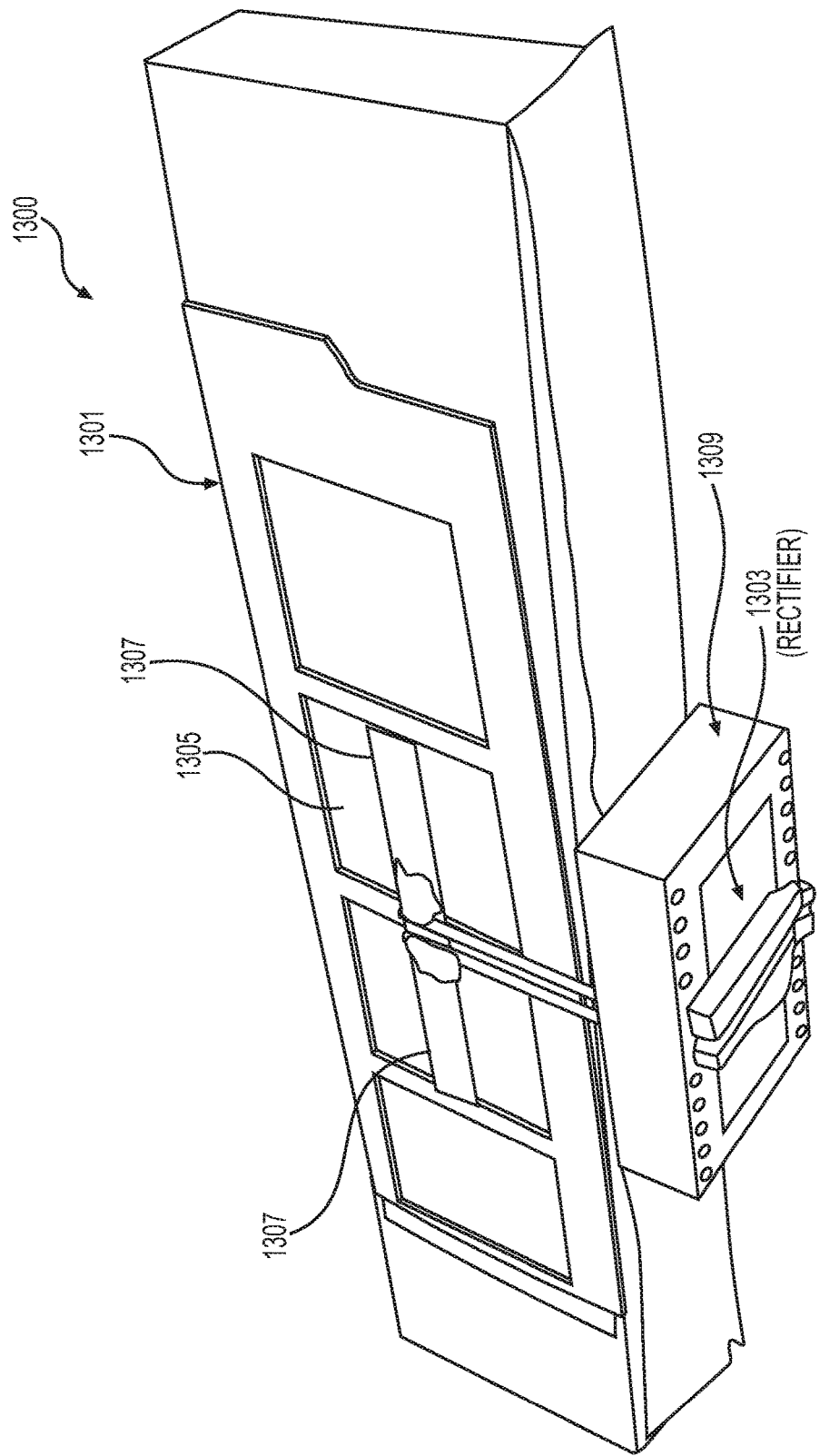
FIG. 13 shows an embodiment of an implemented rectenna illustrating a 2.45 GHz rectifier and an AMC-backed dipole antenna, according to the present invention.

FIG. 13 shows an embodiment of an implemented rectenna illustrating a 2.45 GHz rectifier and an AMC-backed dipole antenna. In FIG. 13, a fabricated AMC-backed dipole antenna 1301, similar in components and construction to the AMC-backed dipole antenna 300, as described herein, is communicatively associated with a suitable rectifier 1303, as known in the art, for electrical power generation and energy harvesting, the AMC-backed dipole antenna 1301 and the rectifier 1303 being combined to form a rectenna 1300, as shown in FIG. 13. In order to verify the suitability of embodiments of the designed AMC-backed antenna 1301 in wireless power transfer (WPT) applications, the rectenna 1300 is realized by integrating the rectifier 1303 with the AMC-backed dipole antenna 1301, as shown in FIG. 13. The 2.45 GHz rectifier 1303 is implemented in the IBM 0.13-μm CMOS process and attains a maximum power conversion efficiency of 49.7% with a load of 25 kΩ. The rectenna 1300 provides the integration of the rectifier 1303 with the AMC-backed antenna 1301 to enable energy harvesting from a dedicated RF source.

The rectifier 1303 is mounted on a printed circuit board (PCB), using a 28 pin integrated circuit (IC) socket 1309, for example. The socket pins of the IC socket 1309 are wire bonded to the RF and dc pads of the rectifier 1303. The RF pins from the IC socket 1309 are connected to the arms of a dipole antenna 1307 using two small wire extensions and silver epoxy cured at 80° C. overnight. It is important that the length of wire extensions be kept as small as possible so that the change in impedance is kept at a minimum. A double sided tape is then used to attach the IC socket 1309 to the AMC-backed dipole antenna 1301 to provide mechanical support to the IC socket 1309 (as illustrated in FIG. 13).

Figure 15:
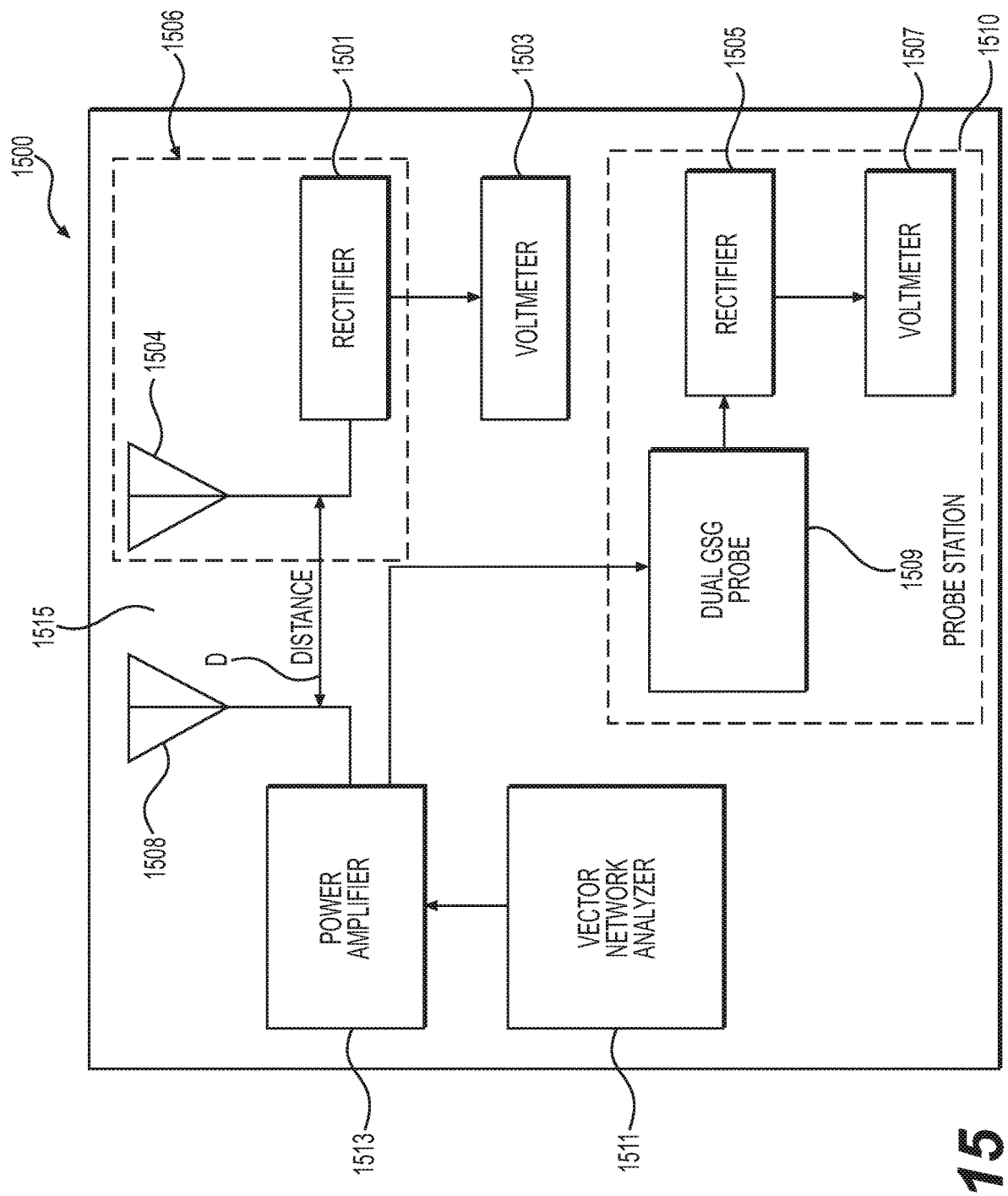
FIG. 15 shows a diagrammatic illustration of an embodiment of a measurement setup of the 2.45 GHz rectenna, including a 2.45 GHz rectifier and an AMC-backed dipole antenna in communicating relation with a reader including a probe apparatus, according to the present invention.

FIG. 15 shows a diagrammatic illustration of an embodiment of a measurement setup 1500 of the 2.45 GHz rectenna 1300, including a 2.45 GHz rectifier 1303 and an AMC-backed dipole antenna 1301 in communicating relation with a reader including a probe apparatus. The various components described in the measurement setup 1500, unless otherwise indicated, are known components in the art for their typically known function. The rectenna 1300 of FIG. 13 is tested using the measurement setup 1500 at 2.45 GHz using a standard horn antenna with a gain of 6 dBi as the transmitting antenna and the rectenna 1300 as the receiving element.

As illustrated on FIG. 15, in the power harvester, one port of the Vector Network Analyzer (VNA) with a power amplifier 1513 provides power of a sufficient RF to a transmitting antenna 1508, as can be a transmitting and receiving antenna 1508. The vector network analyzer 1511 monitors parameters of system, such as amplitude and phase properties, and is coupled with the power amplifier 1513 to provide power for the measurement setup 1500. The resulting incident free space RF wave transmitted by the transmitting antenna 1508 is collected by a receiving antenna 1504, as can be a transmitting and receiving antenna 1504, such as the AMC-backed dipole antenna 1301, and is delivered to a rectifier 1501, such as the rectifier 1303, and converted to a dc output that is read on a voltmeter 1503, the AMC-backed dipole antenna 1504 and the rectifier 1501, forming a rectenna 1506, such as the rectenna 1300 of FIG. 13, for example. The transmitting antenna 1508 and the receiving antenna 1504 of the rectenna 1506 are desirably spaced apart at a distance D for wireless transmission and reception as can depend on the use or application, such as at a distance of about 1 m for blood irradiation applications, for example. The probe station 1510 as an exemplary reader apparatus includes dual ground-signal-ground (GSG) probes 1509, as a reader in the reader apparatus. The dual GSG probes 1509 generate signals as can include information, such as RF signals, to transmit to the rectenna 1506 and to receive information back from the rectenna 1506, such as RF signals as can include information, such as a temperature of blood and a radiation dose delivered to blood in blood irradiation applications, for example. The dual GSG probes 1509 are coupled with a rectifier 1505 to convert the received signals to a dc output that is read on a voltmeter 1507.

Using the measurement setup 1500 of FIG. 15, the rectifier chip, such as the rectifier 1501, is tested for two cases, namely wireless testing, in which case it is integrated with the AMC-backed antenna 1504 to show the power transfer from a dedicated RF source and, also, the case for the output dc voltages being measured on-chip using a direct RF probe feeding. Using the measurement setup 1500, in the first case setup, to characterize the rectenna's power harvesting capabilities, the transmitting antenna 1508 is placed at a fixed location. A 36 dB gain power amplifier, as the power amplifier 1513 and a VNA, as the vector network analyzer 1511, are used to supply the required RF signal to the transmitting antenna 1508 thus achieving a maximum transmit power on the order of 1 Watt (W), for example. A purpose of the power amplifier 1513 is to offset the mismatch losses between the receiving antenna 1504 and the rectifier chip 1501, which are known to be significant. Thus, embodiments of rectenna 1506 are validated as a suitable device, for various applications, such as blood irradiation applications, for example.

Figure 16:
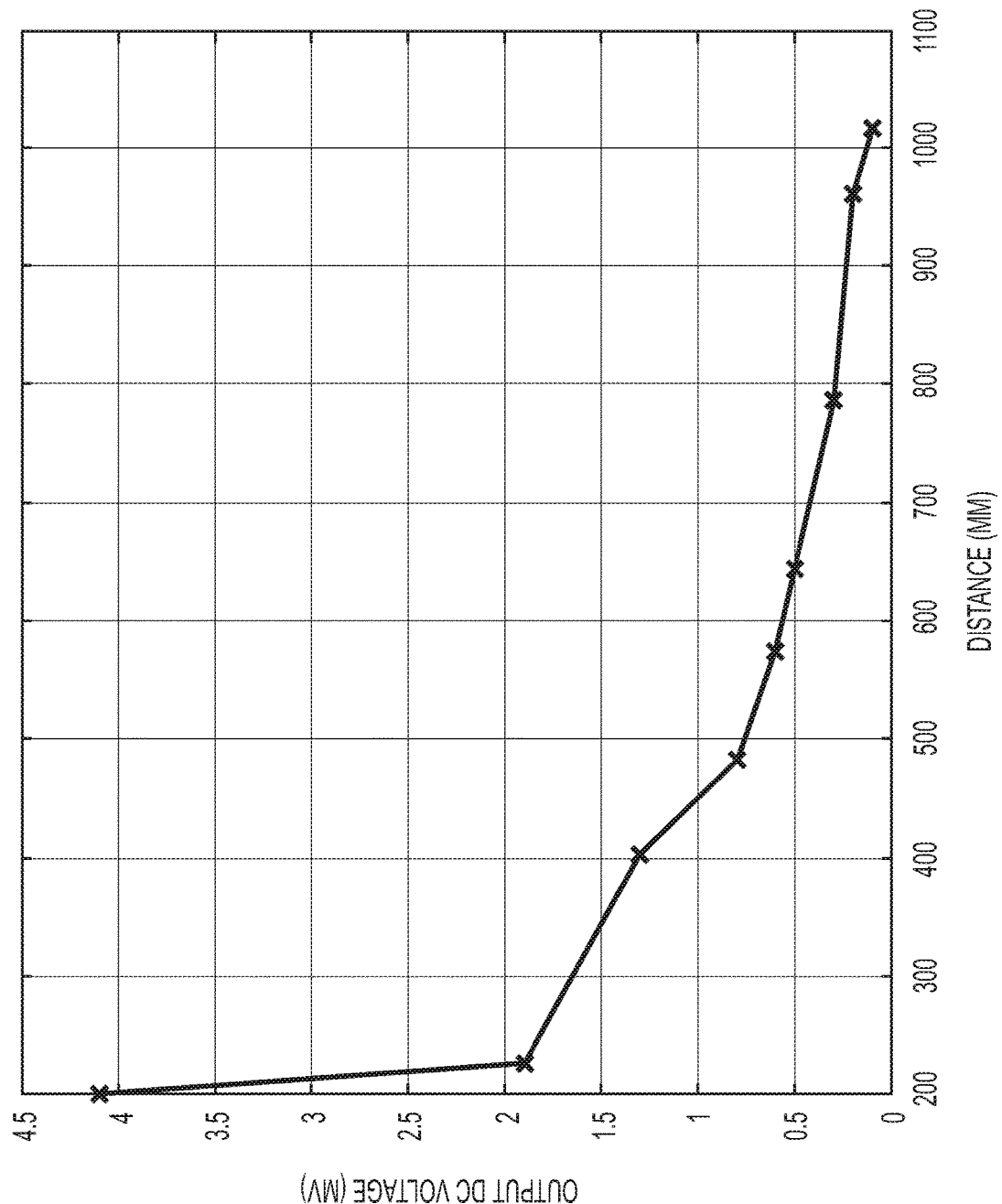
FIG. 16 shows a graphic illustration of realized output voltages of an embodiment of a rectenna including a rectifier and an AMC-backed dipole antenna for varying distances from a transmitting antenna of a reader apparatus, according to the present invention.

To study the dc values realized by the rectifier 1501, the distance D between the transmitting antenna 1508 and the receiving antenna 1504 are varied for the maximum transmit power. Referring now to FIG. 16, there is illustrated a graph showing the relationship between the rectified voltage and the distance from the transmitting antenna of realized output voltages of an embodiment of a rectenna, such as the rectenna 1506 including the rectifier 1501, and the AMC-backed dipole antenna 1504 for varying distances from the transmitting antenna 1508 of a reader apparatus, such as the probe station 1510 including the dual GSG probes 1509. As illustrated in FIG. 16, as the distance D is increased, the dc output voltage reduces until a maximum range of 1 m is reached, where the rectenna 1506 achieves open-circuit voltages of 0.1 millivolts (mV). At the shortest range, the measurement setup 1500 provides a maximum open-circuit voltage of 4.1 mV, for example.

Figure 17:
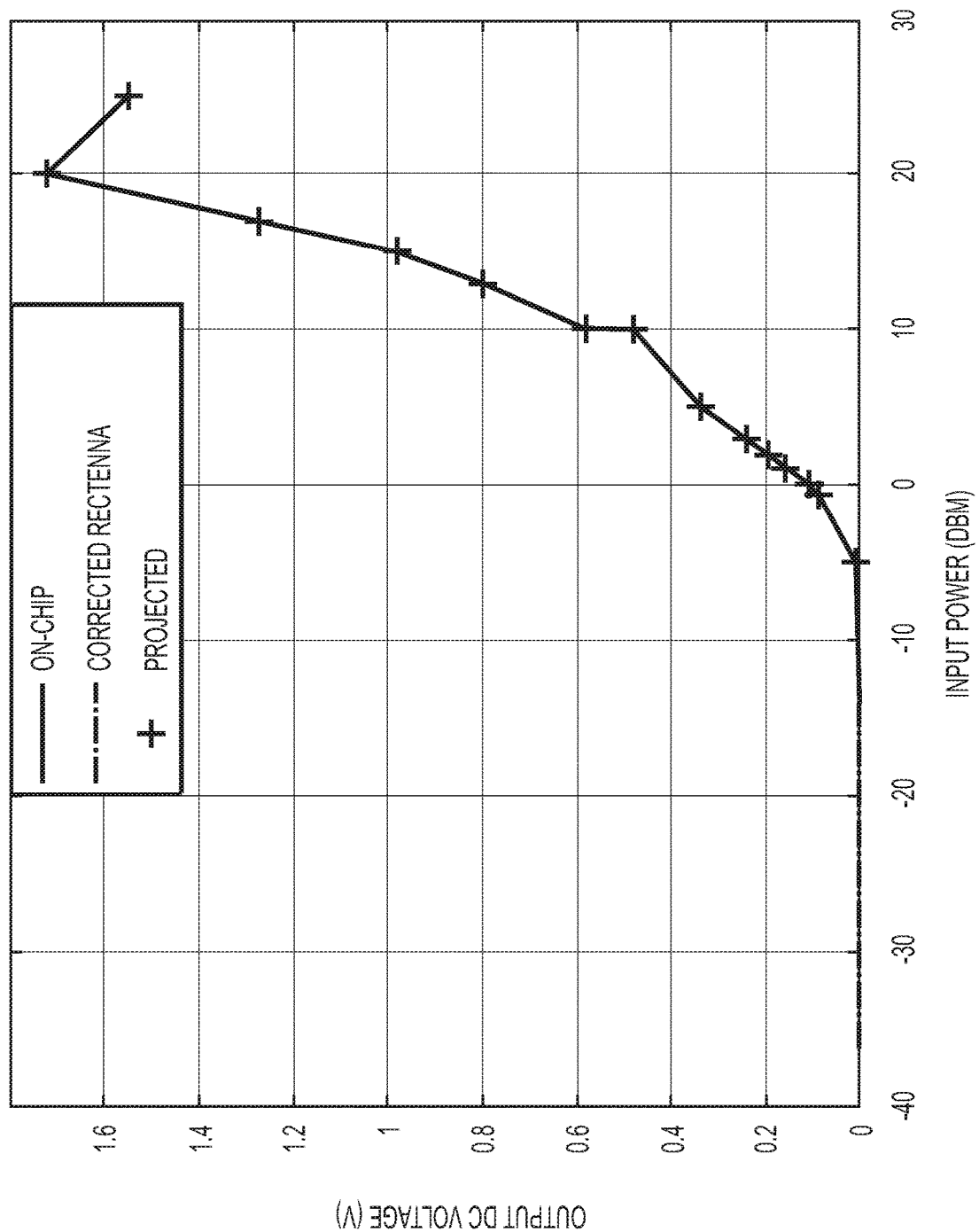
FIG. 17 shows a graphic representation of realized output voltages of a rectifier from on-chip measurements and projected output voltages of an embodiment of a rectenna including a 2.45 GHz rectifier and an AMC-backed dipole antenna, for varying input powers, according to the present invention.

Although these measurements shown by the graph of FIG. 16 is evidence that the rectenna 1506 does harvest energy when excited by a dedicated RF source, the values obtained from these measurements appear to suggest possibly a relatively poor harvesting efficiency. However, the low voltage levels (in the mV range) are attributed to the impedance mismatch between the rectifier 1501 and AMC-backed dipole antenna 1504, since no matching network was implemented for the test measurements, and also likely due to a relatively poor RF-to-dc conversion efficiency of the particular rectifier chip employed in the WPT prototype rectenna 1300 of FIG. 13, although the best conversion efficiency obtained from the measurements was 49.7%. FIG. 17 shows a graphic representation of realized output voltages of a rectifier from on-chip measurements and projected output voltages of an embodiment of a rectenna including a 2.45 GHz rectifier and an AMC-backed dipole antenna, such as the rectenna 1300. Referring to FIG. 17, the graph shows the on-chip (i.e., probe-fed) measured output voltages of the best rectifier chip 1303 from that run, as well as the corresponding projected rectenna output voltages that would have resulted from the wireless power harvester measurement setup 1500 of FIG. 15 (based on a calibrated environment path loss at 2.45 GHz using the Fris equation). It is therefore expected that the rectenna 1300 will produce voltages ranging from 0 V to 1.7 V across a 25 kΩ load for received powers between −5 dBm (decibel-milliwatts) and 20 dBm.

Embodiments of a rectenna including an AMC-backed dipole antenna have been described, as well as the design and performance characteristics of a dipole antenna over an AMC structure are described for use in a proposed dosimeter tag, such as for blood irradiation applications. Embodiments of the design and configuration for a rectenna as described herein provide an AMC structure to facilitate achieve relatively optimal gain and beam width. Embodiments of the dipole-AMC structure desirably operate at 2.45 GHz with a bandwidth from 2.32 GHz to 2.56 GHz, and the AMC antenna structure desirably occupies an area of 20 mm×100 mm with an overall thickness of 9.24 mm.

The AMC antenna structure desirably uses a 1×4 array of AMC unit cells on the AMC surface to significantly improve its broadside gain and reduce its back lobe at its operating frequency. While studies show that increasing the number of AMC unit cells could create high gain antennas with narrow beam width, it was also noted that increasing the AMC bandwidth can have significant implications on the antenna bandwidth. The measured results for the 1×4 array of AMC unit cells desirably show that the antenna reflection coefficient remains relatively constant from 2 GHz to 3 GHz regardless of the bending condition or presence of a lossy host structure. The measured far field radiation pattern results further desirably show that the AMC-backed antenna structure maintains a broadside radiation under bending and on a filled blood bag with a gain variation of about ±0.7 dBi. When integrated with a 2.45 GHz rectifier, the performance and suitability of the AMC-backed antenna structure as part of a wireless power unit indicate that the rectenna is capable of providing the nominal voltage level needed by the proposed dosimeter tag, with projected output dc voltages of up to 1.7 V across a 25 kΩ resistor. In addition, the rectenna achieves a range of up to 1 m, such as is suitable for blood irradiation applications, for example.

Advantageously, embodiments of the AMC-backed antenna structure design can be appropriate for wearable devices, mounting on lossy host structures and for direct integration with wireless power units, biomedical sensing and signal processing chips, as well as for other of various suitable uses and applications. Also, the artificial magnetic conductor structure of the AMC-backed antenna is a high impedance surface reflecting incident electromagnetic waves at the operating frequency with ideally no phase reversal, as can thereby facilitate desirably isolating the antenna from the blood, such as for blood irradiation applications, for example. Also, the AMC-backed antenna structure has good impedance and radiation properties both in air and on the blood bag without any significant deviation in performance, for example.

It is to be understood that the present invention is not limited to the embodiments described above, but encompasses any and all embodiments within the scope of the following claims.

We claim:

1. A blood bag, comprising:
   a bag member to hold blood; and
   a flexible antenna communicatively associated with the blood bag, the flexible antenna comprising:
   a dipole antenna; and
   at least one artificial magnetic conductor (AMC) unit cell communicatively associated with the dipole antenna, wherein each AMC unit cell comprises:
   a top layer including a metallization pattern, the top layer configured as a partially reflective surface to reflect electromagnetic waves of a frequency other than a predetermined frequency of interest;
   a bottom conductive ground plane layer configured to substantially prevent propagation of electromagnetic waves at the predetermined frequency of interest and to reflect the electromagnetic waves at the predetermined frequency of interest; and
   a middle layer comprising a foam material configured to provide a predetermined phase delay between the electromagnetic waves of the predetermined frequency of interest from the top layer and the reflected electromagnetic waves of the predetermined frequency of interest from the ground plane layer to substantially prevent phase reversal of electromagnetic waves at the predetermined frequency of interest,
   wherein said flexible antenna is configured to transmit information about a radiation dose delivered to blood in the bag member to a receiver.

2. A method for detecting a radiation dose delivered to blood in a blood bag, comprising:
   applying to a specific blood bag a wireless dosimeter chip-enabled tag having a predetermined identification (ID) value corresponding to the specific blood bag, the wireless dosimeter chip-enabled tag being communicatively associated with an artificial magnetic conductor (AMC)-backed flexible antenna, the AMC-backed flexible antenna comprising:
   a dipole antenna; and
   at least one AMC unit cell communicatively associated with the dipole antenna, wherein each AMC unit cell comprises:
   a top layer including a metallization pattern, the top layer configured as a partially reflective surface to reflect electromagnetic waves of a frequency other than a predetermined frequency of interest;
   a bottom conductive ground plane layer configured to substantially prevent propagation of electromagnetic waves at the predetermined frequency of interest and to reflect the electromagnetic waves at the predetermined frequency of interest; and
   a middle layer comprising a foam material configured to provide a predetermined phase delay between the electromagnetic waves of the predetermined frequency of interest from the top layer and the reflected electromagnetic waves of the predetermined frequency of interest from the ground plane layer to substantially prevent phase reversal of electromagnetic waves at the predetermined frequency of interest;
   irradiating blood in the specific blood bag with 25 gray (Gy) to 50 Gy of radiation from an X-ray source;
   transmitting from a reader a modulated radio frequency signal including the predetermined frequency of interest containing the predetermined ID value to the wireless dosimeter chip-enabled tag having the predetermined ID value;
   receiving the modulated radio frequency signal containing the predetermined ID value by the AMC-backed flexible antenna communicatively associated with the wireless dosimeter chip-enabled tag having the predetermined ID value;
   transmitting from the wireless dosimeter chip-enabled tag having the predetermined ID value to the reader the modulated radio frequency signal reflected by the AMC-backed flexible antenna including information corresponding to a radiation dose delivered to the blood in the specific blood bag;

receiving, by the reader, the reflected modulated radio frequency signal from the wireless dosimeter chip-enabled tag including the information corresponding to the radiation dose delivered to the blood in the specific blood bag; and determining, using the reader, from the received information, an amount of the radiation dose delivered to the blood in the specific blood bag associated with the wireless dosimeter chip-enabled tag having the predetermined ID value.

3. The method for detecting a radiation dose delivered to blood in a blood bag according to claim 2, further comprising:

demodulating by the reader the received radio frequency signal containing the predetermined ID value of the wireless dosimeter chip-enabled tag and information corresponding to the radiation dose delivered to the blood in the specific blood bag.

4. The method for detecting a radiation dose delivered to blood in a blood bag according to claim 3, wherein the information in the received radio frequency signal includes a sensed X-ray dose delivered to the blood in the specific blood bag and a temperature of the irradiated blood in the specific blood bag.

5. The method for detecting a radiation dose delivered to blood in a blood bag according to claim 2, wherein the information corresponding to the radiation dose delivered includes a sensed X-ray dose delivered to the blood in the specific blood bag and a temperature of the blood irradiated in the specific blood bag.

6. The method for detecting a radiation dose delivered to blood in a blood bag according to claim 2, wherein the predetermined frequency of interest of the modulated radio frequency signal operates at a frequency of about 2.45 GHz.

7. A blood bag, comprising:
a bag member to hold blood; and
a wireless dosimeter chip-enabled tag associated with the blood bag, the wireless dosimeter chip-enabled tag comprising:
a processor to control operation of the wireless dosimeter chip-enabled tag, the processor having an associated memory to store programs, instructions or data for operation of the wireless dosimeter chip-enabled tag;
an oscillator communicatively associated with the processor, the oscillator to generate signals for operation of the wireless dosimeter chip-enabled tag;
a tag identification (ID) communicatively associated with the processor, the tag ID having a predetermined ID value corresponding to the wireless dosimeter chip-enabled tag configured for association with the bag member;
a demodulator communicatively associated with the processor to demodulate a received amplitude-shift keying (ASK) signal, the received ASK signal including a received ID value;
a decoder communicatively associated with the processor and with the demodulator, the decoder to decode the received ASK signal and the received ID value received by the wireless dosimeter chip-enabled tag, the wireless dosimeter chip-enabled tag configured to compare the received ID value to the predetermined ID value of the tag ID;

a radiation sensor communicatively associated with the processor configured to sense an amount of radiation delivered to blood in the bag member;
a modulator communicatively associated with the processor to modulate and format an information or a data signal for transmission from the wireless dosimeter chip-enabled tag;
a flexible antenna communicatively associated with the processor, the flexible antenna comprising:
a dipole antenna; and
at least one artificial magnetic conductor (AMC) unit cell communicatively associated with the dipole antenna, wherein each AMC unit cell comprises:
a top layer including a metallization pattern, the top layer configured as a partially reflective surface to reflect electromagnetic waves of a frequency other than a predetermined frequency of interest;
a bottom conductive ground plane layer configured to substantially prevent propagation of electromagnetic waves at the predetermined frequency of interest and to reflect the electromagnetic waves at the predetermined frequency of interest; and
a middle layer comprising a foam material configured to provide a predetermined phase delay between the electromagnetic waves of the predetermined frequency of interest from the top layer and the reflected electromagnetic waves of the predetermined frequency of interest from the ground plane layer to substantially prevent phase reversal of electromagnetic waves at the predetermined frequency of interest,
wherein said flexible antenna is configured receive the received ID value and to transmit the predetermined ID value and information about a radiation dose sensed by the radiation sensor delivered to blood in the bag member to a receiver, when the received ID value matches the predetermined ID value of the tag ID.

8. The blood bag of claim 7, wherein the wireless dosimeter chip-enabled tag further comprises:
a temperature sensor communicatively associated with the processor to sense the temperature of blood in the bag member.

9. The blood bag of claim 8, wherein the wireless dosimeter chip-enabled tag further comprises:
an energy harvester communicatively associated with the processor to harvest energy from the received ASK signal; and
an energy storage module in communication with the energy harvester to store the harvested energy from the received ASK signal.

10. The blood bag of claim 7, wherein the wireless dosimeter chip-enabled tag further comprises:
an energy harvester communicatively associated with the processor to harvest energy from the received ASK signal; and
an energy storage module in communication with the energy harvester to store the harvested energy from the received ASK signal.

11. The blood bag of claim 7, wherein the flexible antenna is configured to operate at a bandwidth having a frequency in the range of 2.32 GHz to 2.56 GHz as the predetermined frequency of interest.

12. The blood bag of claim 7, wherein the flexible antenna is configured to transmit a data signal to the receiver comprising the predetermined ID value and the information about the radiation dose sensed by the radiation sensor as a PSK backscatter signal to the receiver.

* * * * *